US009218122B2

(12) United States Patent
Thomas et al.

(10) Patent No.: US 9,218,122 B2
(45) Date of Patent: Dec. 22, 2015

(54) SYSTEMS AND METHODS FOR TRANSFERRING SETTINGS ACROSS DEVICES BASED ON USER GESTURES

(75) Inventors: William L. Thomas, Malvern, PA (US); William Korbecki, Lake in the Hills, IL (US)

(73) Assignee: Rovi Guides, Inc., Santa Clara, CA (US)

( * ) Notice: Subject to any disclaimer, the term of this patent is extended or adjusted under 35 U.S.C. 154(b) by 561 days.

(21) Appl. No.: 13/340,316

(22) Filed: Dec. 29, 2011

(65) Prior Publication Data

US 2013/0169546 A1 Jul. 4, 2013

(51) Int. Cl.
*G06F 3/0488* (2013.01)
*G06F 9/445* (2006.01)

(52) U.S. Cl.
CPC .......... *G06F 3/04883* (2013.01); *G06F 9/4451* (2013.01); *G06F 9/44505* (2013.01)

(58) Field of Classification Search
CPC ..... G06F 1/00; G06F 3/04883; G06F 9/4443; G06F 3/044; G06F 3/0416; G09G 2354/00; G09G 2380/02
USPC .................................................. 345/173, 178
See application file for complete search history.

(56) References Cited

U.S. PATENT DOCUMENTS

| 4,429,385 A | 1/1984 | Cichelli et al. |
| 4,625,080 A | 11/1986 | Scott |
| 4,706,121 A | 11/1987 | Young |
| 4,751,578 A | 6/1988 | Reiter et al. |
| 4,761,684 A | 8/1988 | Clark et al. |
| 4,787,063 A | 11/1988 | Muguet |
| 4,908,707 A | 3/1990 | Kinghorn |
| 5,036,314 A | 7/1991 | Barillari et al. |
| 5,089,885 A | 2/1992 | Clark |
| 5,113,259 A | 5/1992 | Romesburg et al. |
| 5,132,992 A | 7/1992 | Yurt et al. |
| 5,155,591 A | 10/1992 | Wachob |
| 5,223,924 A | 6/1993 | Strubbe |
| 5,233,423 A | 8/1993 | Jernigan et al. |
| 5,253,066 A | 10/1993 | Vogel |

(Continued)

FOREIGN PATENT DOCUMENTS

| DE | 31 51 492 | 7/1983 |
| DE | 19 531 121 | 2/1997 |

(Continued)

OTHER PUBLICATIONS

"Honey, is there anything good on the remote tonight?", advertisement from Multichannel News, Broadband Week Section, Nov. 30, 1998, p. 168.

(Continued)

*Primary Examiner* — Michael Faragalla
(74) *Attorney, Agent, or Firm* — Ropes & Gray LLP

(57) ABSTRACT

Systems and methods for transferring settings between user devices using gestures are provided. A selection of media guidance application setting is made. A user input indicative of a direction in which the user wishes to transmit the selected media guidance application setting is received. A determination is made that a device is present in the direction indicated by the user and the device is identified. In response to identifying the device indicated by the user, the selected media guidance application setting is transferred to the identified device. The transferred setting is applied to the device to which the setting was transferred.

18 Claims, 14 Drawing Sheets

(56) References Cited

U.S. PATENT DOCUMENTS

| | | |
|---|---|---|
| 5,335,277 A | 8/1994 | Harvey et al. |
| 5,353,121 A | 10/1994 | Young et al. |
| 5,359,367 A | 10/1994 | Stockill |
| 5,382,983 A | 1/1995 | Kwoh et al. |
| 5,410,326 A | 4/1995 | Goldstein |
| 5,414,756 A | 5/1995 | Levine |
| 5,455,570 A | 10/1995 | Cook et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,502,504 A | 3/1996 | Marshall et al. |
| 5,509,908 A | 4/1996 | Hillstead et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,550,576 A | 8/1996 | Klosterman |
| 5,557,338 A | 9/1996 | Maze et al. |
| 5,559,548 A | 9/1996 | Davis et al. |
| 5,559,549 A | 9/1996 | Hendricks et al. |
| 5,559,550 A | 9/1996 | Mankovitz |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,606,374 A | 2/1997 | Bertram |
| 5,617,526 A | 4/1997 | Oran et al. |
| 5,619,249 A | 4/1997 | Billock et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,640,484 A | 6/1997 | Mankovitz |
| 5,654,748 A | 8/1997 | Matthews, III |
| 5,657,072 A | 8/1997 | Aristides et al. |
| 5,666,293 A | 9/1997 | Metz et al. |
| 5,673,089 A | 9/1997 | Yuen et al. |
| 5,675,390 A | 10/1997 | Schindler et al. |
| 5,682,206 A | 10/1997 | Wehmeyer et al. |
| 5,692,214 A | 11/1997 | Levine |
| 5,694,163 A | 12/1997 | Harrison |
| 5,699,107 A | 12/1997 | Lawler et al. |
| 5,710,601 A | 1/1998 | Marshall et al. |
| 5,734,853 A | 3/1998 | Hendricks et al. |
| 5,734,893 A | 3/1998 | Li et al. |
| 5,748,191 A | 5/1998 | Rozak et al. |
| 5,748,716 A | 5/1998 | Levine |
| 5,758,257 A | 5/1998 | Herz et al. |
| 5,758,259 A | 5/1998 | Lawler |
| 5,781,246 A | 7/1998 | Alten et al. |
| 5,787,259 A | 7/1998 | Haroun et al. |
| 5,788,507 A | 8/1998 | Redford et al. |
| 5,790,202 A | 8/1998 | Kummer et al. |
| 5,793,964 A | 8/1998 | Rogers et al. |
| 5,798,785 A | 8/1998 | Hendricks et al. |
| 5,812,931 A | 9/1998 | Yuen |
| 5,828,420 A | 10/1998 | Marshall et al. |
| 5,844,620 A | 12/1998 | Coleman et al. |
| 5,850,218 A | 12/1998 | LaJoie et al. |
| 5,858,866 A | 1/1999 | Berry et al. |
| 5,867,233 A | 2/1999 | Tanaka et al. |
| 5,880,768 A | 3/1999 | Lemmons et al. |
| 5,886,732 A | 3/1999 | Humpleman |
| 5,886,746 A | 3/1999 | Yuen et al. |
| 5,907,323 A | 5/1999 | Lawler et al. |
| 5,914,746 A | 6/1999 | Matthews, III et al. |
| 5,977,964 A | 11/1999 | Williams et al. |
| 5,986,650 A | 11/1999 | Ellis et al. |
| 5,988,078 A | 11/1999 | Levine |
| 6,002,394 A | 12/1999 | Schein et al. |
| 6,014,184 A | 1/2000 | Knee et al. |
| 6,016,141 A | 1/2000 | Knudson et al. |
| 6,097,441 A | 8/2000 | Allport |
| 6,104,334 A | 8/2000 | Allport |
| 6,130,726 A | 10/2000 | Darbee et al. |
| 6,169,543 B1 | 1/2001 | Wehmeyer |
| 6,177,931 B1 | 1/2001 | Alexander et al. |
| 6,208,384 B1 | 3/2001 | Schultheiss |
| 6,226,444 B1 | 5/2001 | Goldschmidt Iki et al. |
| 6,226,618 B1 | 5/2001 | Downs et al. |
| 6,233,734 B1 | 5/2001 | Macrae et al. |
| 6,239,794 B1 | 5/2001 | Yuen et al. |
| 6,263,501 B1 | 7/2001 | Schein et al. |
| 6,263,503 B1 | 7/2001 | Margulis |
| 6,268,849 B1 | 7/2001 | Boyer et al. |
| 6,310,886 B1 | 10/2001 | Barton |
| 6,324,338 B1 | 11/2001 | Wood et al. |
| 6,331,877 B1 | 12/2001 | Bennington et al. |
| 6,354,378 B1 | 3/2002 | Patel |
| 6,357,043 B1 | 3/2002 | Ellis et al. |
| 6,418,556 B1 | 7/2002 | Bennington et al. |
| 6,463,585 B1 | 10/2002 | Hendricks et al. |
| 6,522,342 B1 | 2/2003 | Gagnon et al. |
| 6,536,041 B1 | 3/2003 | Knudson et al. |
| 6,564,378 B1 | 5/2003 | Satterfield et al. |
| 6,611,654 B1 | 8/2003 | Shteyn |
| 6,614,987 B1 | 9/2003 | Ismail et al. |
| 6,651,253 B2 | 11/2003 | Dudkiewicz et al. |
| 6,756,997 B1 | 6/2004 | Ward, III et al. |
| 6,760,412 B1 | 7/2004 | Loucks |
| 6,760,537 B2 | 7/2004 | Mankovitz |
| 6,813,775 B1 | 11/2004 | Finseth et al. |
| 6,813,777 B1 | 11/2004 | Weinberger et al. |
| 6,837,789 B2 | 1/2005 | Garahi et al. |
| 6,868,225 B1 | 3/2005 | Brown et al. |
| 6,897,904 B2 | 5/2005 | Potrebic et al. |
| 6,950,624 B2 | 9/2005 | Kim et al. |
| 7,003,791 B2 | 2/2006 | Mizutani |
| 7,013,478 B1 | 3/2006 | Hendricks et al. |
| 7,020,704 B1 | 3/2006 | Lipscomb et al. |
| 7,055,166 B1 | 5/2006 | Logan et al. |
| 7,088,952 B1 | 8/2006 | Saito et al. |
| 7,134,130 B1 | 11/2006 | Thomas |
| 7,165,098 B1 | 1/2007 | Boyer et al. |
| 7,200,852 B1 | 4/2007 | Block |
| 7,206,892 B2 | 4/2007 | Kim et al. |
| 7,213,089 B2 | 5/2007 | Hatakenaka |
| 7,224,889 B2 | 5/2007 | Takasu et al. |
| 7,268,833 B2 | 9/2007 | Park et al. |
| 7,296,284 B1 | 11/2007 | Price et al. |
| 7,344,084 B2 | 3/2008 | DaCosta |
| 7,386,871 B1 | 6/2008 | Knudson et al. |
| 7,428,744 B1 | 9/2008 | Ritter et al. |
| 7,458,093 B2 | 11/2008 | Dukes et al. |
| 7,518,503 B2 | 4/2009 | Peele |
| 7,603,685 B2 | 10/2009 | Knudson et al. |
| 7,689,556 B2 | 3/2010 | Garg et al. |
| 7,783,632 B2 | 8/2010 | Richardson et al. |
| 7,852,416 B2 | 12/2010 | Bennett et al. |
| 8,006,263 B2 | 8/2011 | Ellis et al. |
| 8,060,399 B2 | 11/2011 | Ullah |
| 8,104,066 B2 | 1/2012 | Colsey et al. |
| 8,122,491 B2 | 2/2012 | Yee et al. |
| 8,266,666 B2 | 9/2012 | Friedman |
| 8,331,987 B2 | 12/2012 | Rosenblatt |
| 8,601,526 B2 | 12/2013 | Nishimura et al. |
| 2002/0032907 A1 | 3/2002 | Daniels |
| 2002/0056087 A1 | 5/2002 | Berezowski et al. |
| 2002/0056119 A1 | 5/2002 | Moynihan |
| 2002/0059610 A1 | 5/2002 | Ellis |

(56) References Cited

U.S. PATENT DOCUMENTS

| | | |
|---|---|---|
| 2002/0075402 A1 | 6/2002 | Robson et al. |
| 2002/0078453 A1 | 6/2002 | Kuo |
| 2002/0090203 A1 | 7/2002 | Mankovitz |
| 2002/0157099 A1 | 10/2002 | Schrader et al. |
| 2002/0165751 A1 | 11/2002 | Upadhya |
| 2002/0165770 A1 | 11/2002 | Khoo et al. |
| 2002/0174430 A1 | 11/2002 | Ellis et al. |
| 2002/0194586 A1 | 12/2002 | Gutta et al. |
| 2002/0194600 A1 | 12/2002 | Ellis et al. |
| 2003/0005440 A1 | 1/2003 | Axelsson et al. |
| 2003/0066085 A1 | 4/2003 | Boyer et al. |
| 2003/0070177 A1 | 4/2003 | Kondo et al. |
| 2003/0093803 A1 | 5/2003 | Ishikawa et al. |
| 2003/0110499 A1 | 6/2003 | Knudson et al. |
| 2003/0140343 A1 | 7/2003 | Falvo et al. |
| 2003/0149621 A1 | 8/2003 | Shteyn |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0237093 A1 | 12/2003 | Marsh |
| 2004/0064835 A1 | 4/2004 | Bellwood et al. |
| 2004/0070491 A1 | 4/2004 | Huang et al. |
| 2004/0097246 A1 | 5/2004 | Welch |
| 2004/0103434 A1 | 5/2004 | Ellis |
| 2004/0117831 A1 | 6/2004 | Ellis et al. |
| 2004/0177370 A1 | 9/2004 | Dudkiewicz |
| 2004/0210926 A1 | 10/2004 | Francis et al. |
| 2004/0210932 A1 | 10/2004 | Mori et al. |
| 2004/0268403 A1 | 12/2004 | Krieger et al. |
| 2005/0028208 A1 | 2/2005 | Ellis et al. |
| 2005/0120373 A1 | 6/2005 | Thomas et al. |
| 2005/0138660 A1 | 6/2005 | Boyer et al. |
| 2005/0149966 A1 | 7/2005 | Fairhurst et al. |
| 2005/0160461 A1 | 7/2005 | Baumgartner et al. |
| 2005/0204388 A1 | 9/2005 | Knudson et al. |
| 2005/0246746 A1 | 11/2005 | Yui et al. |
| 2005/0251827 A1 | 11/2005 | Ellis et al. |
| 2005/0259963 A1 | 11/2005 | Sano et al. |
| 2005/0278741 A1 | 12/2005 | Robarts et al. |
| 2006/0007479 A1 | 1/2006 | Henry et al. |
| 2006/0026635 A1 | 2/2006 | Potrebic et al. |
| 2006/0026665 A1 | 2/2006 | Rodriguez et al. |
| 2006/0031883 A1 | 2/2006 | Ellis et al. |
| 2006/0053449 A1 | 3/2006 | Gutta |
| 2006/0101492 A1 | 5/2006 | Lowcock |
| 2006/0190978 A1 | 8/2006 | Russ et al. |
| 2006/0218573 A1 | 9/2006 | Proebstel |
| 2006/0218604 A1 | 9/2006 | Riedl et al. |
| 2006/0253874 A1 | 11/2006 | Stark et al. |
| 2006/0263758 A1 | 11/2006 | Crutchfield et al. |
| 2006/0265427 A1 | 11/2006 | Cohen et al. |
| 2006/0277579 A1 | 12/2006 | Inkinen |
| 2006/0294574 A1 | 12/2006 | Cha |
| 2007/0033607 A1 | 2/2007 | Bryan |
| 2007/0036303 A1 | 2/2007 | Lee et al. |
| 2007/0055989 A1 | 3/2007 | Shanks et al. |
| 2007/0074245 A1 | 3/2007 | Nyako et al. |
| 2007/0076665 A1 | 4/2007 | Nair et al. |
| 2007/0089132 A1 | 4/2007 | Qureshey et al. |
| 2007/0130089 A1 | 6/2007 | Chiu |
| 2007/0130283 A1 | 6/2007 | Klein et al. |
| 2007/0157240 A1 | 7/2007 | Walker |
| 2007/0161402 A1 | 7/2007 | Ng. et al. |
| 2007/0162850 A1 | 7/2007 | Adler et al. |
| 2007/0186240 A1 | 8/2007 | Ward et al. |
| 2007/0214489 A1 | 9/2007 | Kwong et al. |
| 2007/0283395 A1 | 12/2007 | Wezowski |
| 2008/0046930 A1 | 2/2008 | Smith et al. |
| 2008/0046935 A1 | 2/2008 | Krakirian |
| 2008/0059988 A1 | 3/2008 | Lee et al. |
| 2008/0074546 A1 | 3/2008 | Momen |
| 2008/0077965 A1 | 3/2008 | Kamimaki et al. |
| 2008/0127253 A1 | 5/2008 | Zhang et al. |
| 2008/0134256 A1 | 6/2008 | DaCosta |
| 2008/0155585 A1 | 6/2008 | Craner et al. |
| 2008/0184294 A1 | 7/2008 | Lemmons et al. |
| 2008/0189737 A1 | 8/2008 | Ellis et al. |
| 2008/0196068 A1 | 8/2008 | Tseng |
| 2008/0214233 A1* | 9/2008 | Wilson et al. .............. 455/556.1 |
| 2008/0282288 A1 | 11/2008 | Heo |
| 2008/0300985 A1 | 12/2008 | Shamp et al. |
| 2008/0301729 A1 | 12/2008 | Broos et al. |
| 2009/0087039 A1 | 4/2009 | Matsuura |
| 2009/0125971 A1 | 5/2009 | Belz et al. |
| 2009/0150925 A1 | 6/2009 | Henderson |
| 2009/0165046 A1 | 6/2009 | Stallings et al. |
| 2009/0183208 A1 | 7/2009 | Christensen et al. |
| 2009/0210898 A1 | 8/2009 | Childress et al. |
| 2009/0217335 A1 | 8/2009 | Wong et al. |
| 2009/0249391 A1 | 10/2009 | Klein et al. |
| 2009/0271829 A1 | 10/2009 | Larsson et al. |
| 2009/0288131 A1 | 11/2009 | Kandekar et al. |
| 2009/0288132 A1 | 11/2009 | Hegde |
| 2009/0292671 A1 | 11/2009 | Ramig et al. |
| 2009/0313658 A1 | 12/2009 | Nishimura et al. |
| 2010/0053458 A1 | 3/2010 | Anglin et al. |
| 2010/0107046 A1 | 4/2010 | Kang et al. |
| 2010/0107194 A1 | 4/2010 | McKissick et al. |
| 2010/0146445 A1 | 6/2010 | Kraut |
| 2010/0146560 A1 | 6/2010 | Bonfrer |
| 2010/0146573 A1 | 6/2010 | Richardson et al. |
| 2010/0169072 A1 | 7/2010 | Zaki et al. |
| 2010/0199313 A1 | 8/2010 | Rhim |
| 2010/0262987 A1 | 10/2010 | Imanilov |
| 2010/0310234 A1 | 12/2010 | Sigvaldason |
| 2011/0016492 A1 | 1/2011 | Morita |
| 2011/0029922 A1 | 2/2011 | Hoffberg et al. |
| 2011/0069940 A1 | 3/2011 | Shimy et al. |
| 2011/0070819 A1 | 3/2011 | Shimy et al. |
| 2011/0072452 A1 | 3/2011 | Shimy et al. |
| 2011/0078731 A1 | 3/2011 | Nishimura |
| 2011/0107388 A1 | 5/2011 | Lee et al. |
| 2011/0134320 A1 | 6/2011 | Daly |
| 2011/0163939 A1 | 7/2011 | Tam et al. |
| 2011/0164175 A1 | 7/2011 | Chung et al. |
| 2011/0167447 A1 | 7/2011 | Wong |
| 2011/0258211 A1 | 10/2011 | Kalisky et al. |
| 2012/0072964 A1 | 3/2012 | Walter et al. |
| 2012/0105720 A1 | 5/2012 | Chung et al. |
| 2012/0114303 A1 | 5/2012 | Chung et al. |
| 2013/0047189 A1 | 2/2013 | Raveendran et al. |
| 2013/0147833 A1* | 6/2013 | Aubauer et al. .............. 345/619 |

FOREIGN PATENT DOCUMENTS

| | | |
|---|---|---|
| DE | 19 740 079 | 3/1999 |
| EP | 0 774 853 | 5/1997 |
| EP | 0 793 225 | 9/1997 |
| EP | 0805594 | 11/1997 |
| EP | 1363452 | 11/2003 |
| EP | 2129113 | 12/2009 |
| EP | 2154882 | 2/2010 |
| EP | 2299711 | 3/2011 |
| GB | 2265792 | 10/1993 |
| GB | 2458727 | 10/2009 |
| JP | 03-022770 | 1/1991 |
| JP | 8-56352 | 2/1996 |
| JP | 09-102827 | 4/1997 |
| WO | WO-8703766 | 6/1987 |
| WO | WO-8903085 | 4/1989 |
| WO | WO-9414282 | 6/1994 |
| WO | WO-9501056 | 1/1995 |
| WO | WO-9501059 | 1/1995 |
| WO | WO-9510910 | 4/1995 |
| WO | WO-9528055 | 10/1995 |
| WO | WO-9532585 | 11/1995 |
| WO | WO-9607270 | 3/1996 |
| WO | WO-9613932 | 5/1996 |
| WO | WO-9620555 | 7/1996 |
| WO | WO-9713368 | 4/1997 |
| WO | WO-9731480 | 8/1997 |

(56) References Cited

FOREIGN PATENT DOCUMENTS

| WO | WO-9736422 | 10/1997 |
|---|---|---|
| WO | WO-9747106 | 12/1997 |
| WO | WO-9747143 | 12/1997 |
| WO | WO-9749237 | 12/1997 |
| WO | WO-9750251 | 12/1997 |
| WO | WO-9810589 | 3/1998 |
| WO | WO-9816062 | 4/1998 |
| WO | WO-9817064 | 4/1998 |
| WO | WO-9826584 | 6/1998 |
| WO | WO-9914947 | 3/1999 |
| WO | WO-9930491 | 6/1999 |
| WO | WO-0033576 | 6/2000 |
| WO | WO-0191458 | 11/2001 |
| WO | WO-2007036891 | 4/2007 |
| WO | WO-2009067670 | 5/2009 |
| WO | WO-2009148056 | 12/2009 |
| WO | WO 2009151635 A1 | 12/2009 |
| WO | WO 2011008638 A1 | 1/2011 |
| WO | WO-2011037761 | 3/2011 |
| WO | WO 2011037781 A2 | 3/2011 |
| WO | WO-2011084950 | 7/2011 |

OTHER PUBLICATIONS

"How Evolve Works," from the Internet at http://www.evolveproducts.com/network.html, printed on Dec. 28, 1998.

"Jini Architecture Overview," by Jim Waldo, from the Internet at http://Java.sun.com/products/jini/whitepapers/architectureoverview.pdf/ pinted on Jan. 25, 1999. The document bears a copyright date of 1998.

"Reaching your subscribers is a complex and costly process-until now," from the Internet at http://www.evolveproducts.com/info.html, printed on Dec. 28, 1998.

"Sun's Next Steps in Digital Set-Tops," article in Cablevision, Nov. 16, 1998, p. 56.

"The Evolve EZ Guide. The Remote Control," from the Internet at http://www.evolveproducts.com/display2.html, printed on Dec. 28, 1998.

"Using StarSight 2," published before Apr. 19, 1995.

"What is Jini?", from the Internet at http://java.sun.com/products/jini/whitepapers/whatsjini.pdf, printed on Jan. 25, 1999.

"Why Jini Now?", from the internet at http://java.sun.com/products/jini/whitepapers/whyjininow.pdf, printed on Jan. 25, 1999. The document bears a copyright date of 1998.

Darrow, A. et al., "Design Guidelines for Technology-Mediated Social Interaction in a Presence Sensing Physical Space," Carnegie Mellon University Research Showcase, Carnegie Institute of Technology, Jan. 1, 2007, pp. 1-9.

Eitz, Gerhard, "Zukunftige Informations-Und Datenangebote Beim Digitalen Fernsehen—EPG Und Lesezeichen," Rundfunktechnische Mitteilungen, vol. 41, pp. 67-72, Apr. 30, 1997. (English language translation attached.).

Index Systems Inc., "Gemstar Service Object Model," Data Format Specification, Ver. 2.0.4, pp. 58-59.

Jaidev, "EXSLT—A Wired and Wireless Case Study," http://csharpcomputing.com/XMLTutorial/Lession15.htm.

Neumann, Andreas, "WDR Online Aufbau Und Perspektiven Automatisierter Online-Dienste Im WDR," Rundfunktechnische Mitteilungen, vol. 41, Jan. 21, 1997, pp. 56-66. (English language translation attached.).

Papers Delivered (Part1), 61st National Conference, Information Processing Society of Japan, Oct. 3-5, 2000.

Pogue, D., "State of the Art: For TiVo and Replay, New Reach," N.Y. Times, May 29, 2003.

Randerson, J., "Let Software Catch the Game for You," New Scientist, Jul. 3, 2004.

Rogers, Curt, "Telcos vs. Cable TV: The Global View," Data Communications, No. 13, New York, Sep. 1995, pp. 75, 76, 78 and 80.

* cited by examiner

700

| MESSAGE |
|---|

```
<INFORMATION FILE>
710 ⌒ <User_Profile_Data>
       720 ⌒ <User>John</User>
              <Gender>Male</Gender>
              <Age>32</Age>
              <ID>17214132</ID>
730 ⌒ </User_Profile_Data>
       <Access_Rights>
       740 ⌒ <Media1>
              <META DATA>
              741 ⌒ <ContentType>Movie</ContentType>
              742 ⌒ <Title>War of the Worlds</Title>
              743 ⌒ <Genre>SciFi</Genre>
              744 ⌒ <HashCode>FF0A1342</HashCode>
              </META DATA>
              </Media1>
       750 ⌒ <Media2>
              751 ⌒ <MediaID>17232719</MediaID>
              752 ⌒ <MediaHash>F0AF6666</MediaHash>
              753 ⌒ <DateStamp>10/10/2012</DateStamp>
              754 ⌒ <TimeStamp>10:30PM</TimeStamp>
              </Media2>
       760 ⌒ <MediaChannel1>
              761 ⌒ <Subscription>1 Month</Subscription>
              762 ⌒ <MediaHash>1EEECAFC</MediaHash>
              </MediaChannel1>
       </Access_Rights>
</INFORMATION FILE>
```

FIG. 7

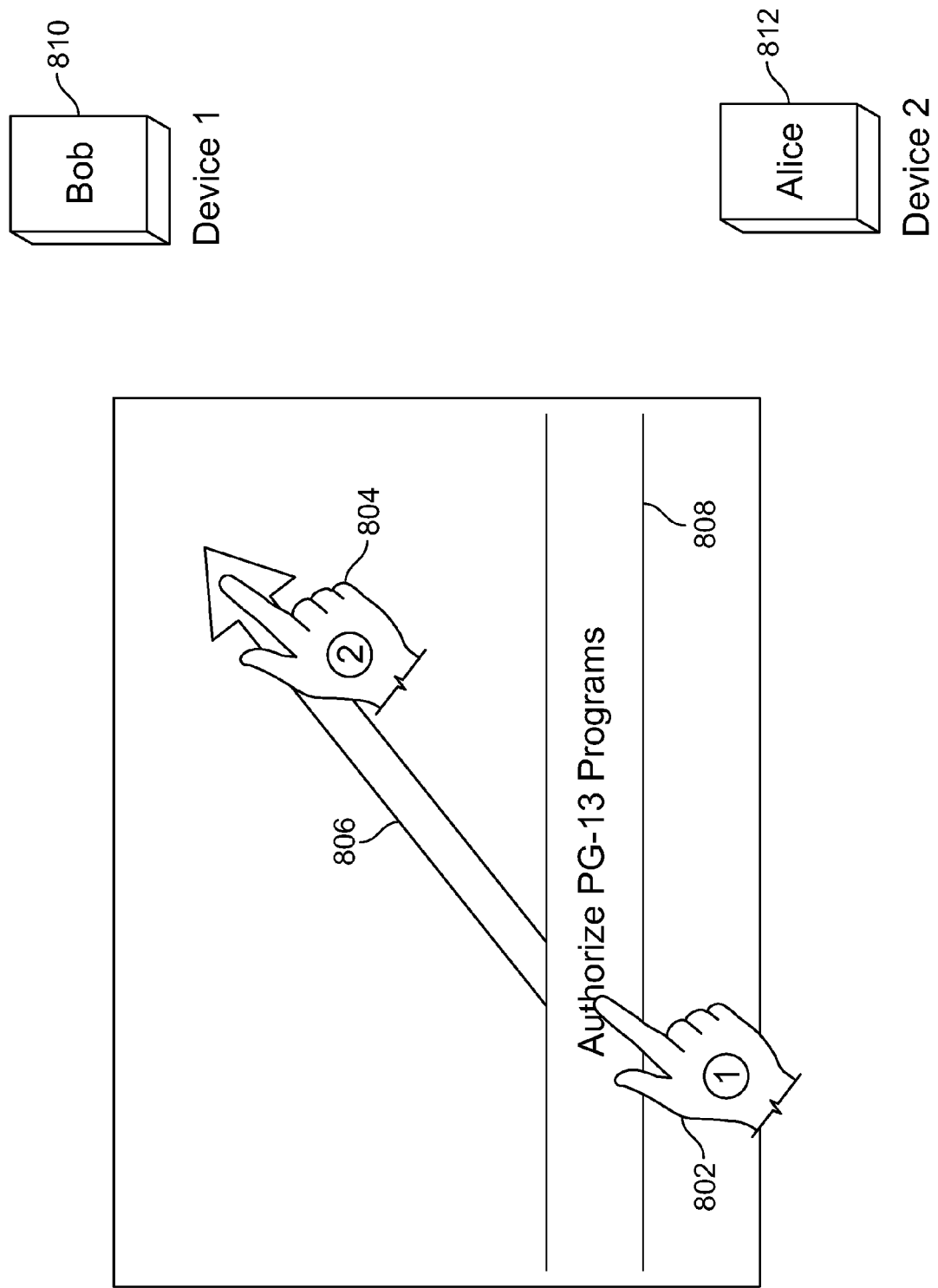

1100

Settings You Have Transferred to Bob ⌐1114

1116⌐ Authorize PG-13 Programs

John's Favorite Channels

1202⌐ Settings You have Transferred

1204⌐ Authorize PG-13 Programs  1206⌐ [Bob]

John's Favorite Channels  1208⌐ [Bob]

Authorize Viewing of Programs with Violence  1210⌐ [Alice]

FIG. 12

SYSTEMS AND METHODS FOR TRANSFERRING SETTINGS ACROSS DEVICES BASED ON USER GESTURES

BACKGROUND

Mobile devices have proliferated society. More particularly, the manner in which users interact with their mobile devices has fundamentally changed with the advent of multi-touch technology which allows users to interact with their devices using gestures. For example, users may interact with their smart-phones and tablet computers using a variety of gestures such as swiping their fingers across the screen, performing a pinching or spreading out action with their fingers on the screen, or tapping items shown on the screen. However, the manner in which users transfer media items across multiple devices has largely remained unchanged from conventional methods of selecting a media item and then selecting a destination device using a menu.

SUMMARY OF THE INVENTION

In view of the foregoing, systems and methods for transferring settings across devices based on user gestures are provided. In particular, a user may select a setting to transfer to another device and may perform a gesture indicative of the direction in which the device he or she wishes to transfer the setting to is located. The setting may then be transferred to the indicated device.

In some embodiments, the user may perform the gesture using one or more fingers, a hand, or by physically manipulating the device itself. The user's device may recognize a variety of gestures. The user's device may detect and register the direction indicated by the user's gesture and identify the device(s) located in the gestured direction. The device may prompt the user to confirm the identified device(s). Upon confirmation of the identified device by the user, the device may transfer the selected setting to the identified device(s).

In some embodiments, the user's device may be in direct communication with other devices neighboring it. For example, devices could communicate directly using Bluetooth, infra-red, or any other suitable wireless link. Accordingly, the user's device may transfer the setting to the identified device(s) directly using the direct communications links discussed above.

In some embodiments, the user's device may not be in direct communication with other devices neighboring it. For example, devices may communicate with each other through an intermediate server which acts as an intermediary facilitating inter-device communication. Such an intermediate server could be based on the Internet, in a cloud, or on a local network. Accordingly, the user's device may transfer the setting to the identified device(s) directly using the indirect communications links discussed above.

In some embodiments, the user's device may be continuously aware of the locations of other devices in its neighborhood. For example, the user's device may periodically (or continuously) poll other devices for their locations. Alternatively, the user's device may periodically (continuously) query a central server for the locations of other devices in its neighborhood or the user's device may only attempt to determine the location of another device in response to receiving a user gesture indicative of a direction in which to transfer a setting.

In some embodiments, the user's device may automatically detect another device when it is in close proximity to the user's device. Based on the determination that another device is in close proximity to it, the user's device may prompt the user to ask whether the user wishes to transfer any settings to the device in proximity.

In some embodiments, the user may be able to select multiple devices to transfer one or more settings to. For example, the user's device may determine that multiple devices are present in the direction in which the user gestures. The user may be presented with an option to transfer the selected setting(s) to one or more of the identified devices based on this determination. Alternatively, the user may make separate gestures in multiple directions and the user's device may identify corresponding devices in each of the directions in which the user gestures. The user may then be able to transfer the selected setting(s) to one or more of the identified devices.

In some embodiments, the user may wish to retract a setting from a device to which the user previously transferred a setting to. The user may select an option to retract a setting on his or her device and then perform a gesture indicative of the direction in which the device to retract the setting from is located. The user may perform multiple gestures where each gesture may be indicative of one or more other devices. The user's device may identify the indicated device(s) and make a determination of whether the device(s) has any setting(s) that the user may retract. The user's device may generate a screen displaying a list of the settings that the user has previously transferred to various other devices. The user may be able to select one or more settings from the displayed screen to retract. The user's device may then proceed to retract the selected setting(s).

In some embodiments, the user may associate restrictions to the setting transferred to another device. For example, the user may stipulate that the setting be active on the device to which it is transferred for at most a pre-determined period of time. The user's device may display an option for the user to configure such restrictions before the setting is transferred to another device. The device may generate and display an option enabling the user to adjust the restrictions associated with a setting after the setting has been transferred to another device.

In some embodiments, a user may receive a setting from another user and may be able to further transfer the setting to a third user. The user's device may make a determination as to whether any restrictions preventing further transfer of the setting are associated with the setting. In response to determining that there are no such restrictions, the user's device may transfer the setting to the device(s) indicated by the user.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 7 illustrates an example of a message that may be transferred from the user's device to another device in accordance with an embodiment of the invention;

FIGS. 8(a) and 8(b) show two illustrative methods for transferring a setting from a first device to a second device indicated by a user gesture in accordance with an embodiment of the invention;

FIGS. 11(a) and 11(b) show an illustrative method for retracting a setting that was previously transferred to a target device in accordance with an embodiment of the invention;

FIG. 12 shows an illustrative display screen that may list all settings that the user has transferred to other devices in accordance with an embodiment of the invention;

DETAILED DESCRIPTION

Figure 1:
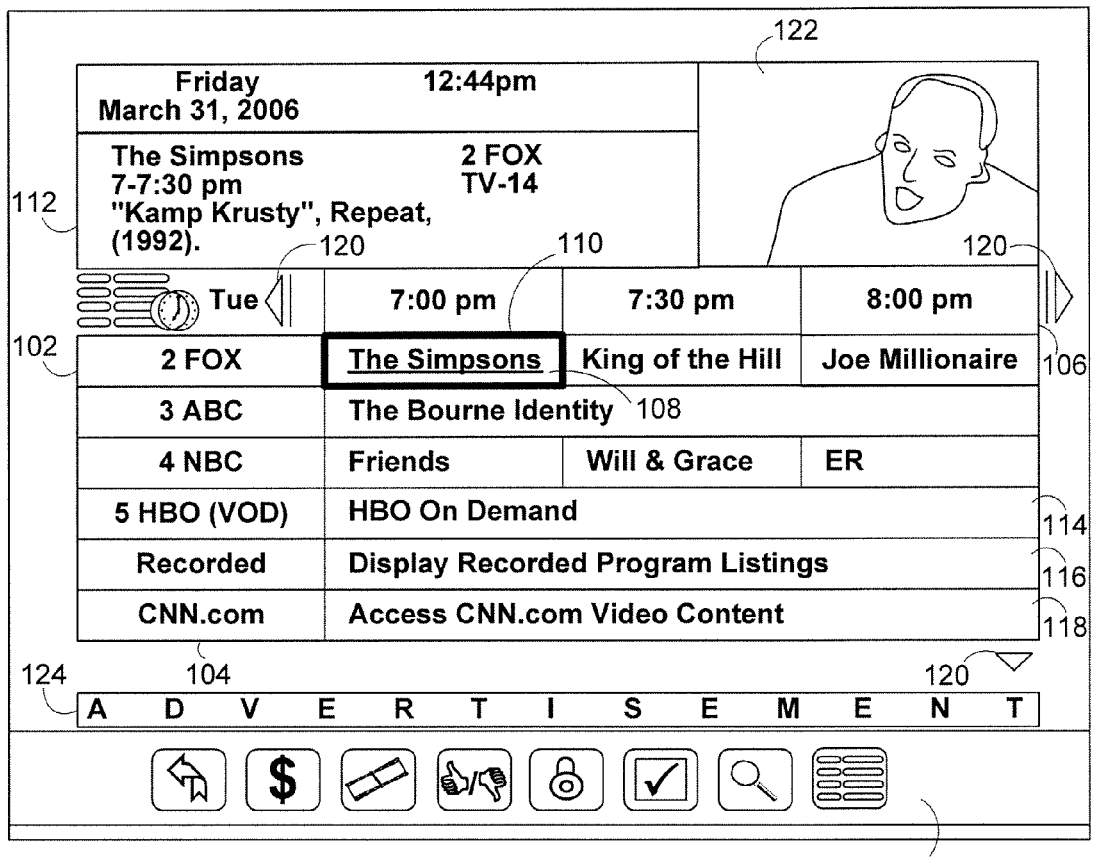
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content, such as media listings, media-related information ((e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.)), on-demand information, blogs, websites, and any other type of guidance data that is helpful for a user to navigate among and locate desired content selections.

FIGS. 1, 2, 5, 6, 9, 10, 11(b), and 12 show illustrative display screens that may be used to provide media guidance data. The display screens shown in FIGS. 1, 2, 5, 6, 9, 10, 11(b), and 12 may be implemented on any suitable user equipment device or platform. While the displays of FIGS. 1, 2, 5, 6, 9, 10, 11(b), and 12 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. The various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 2:
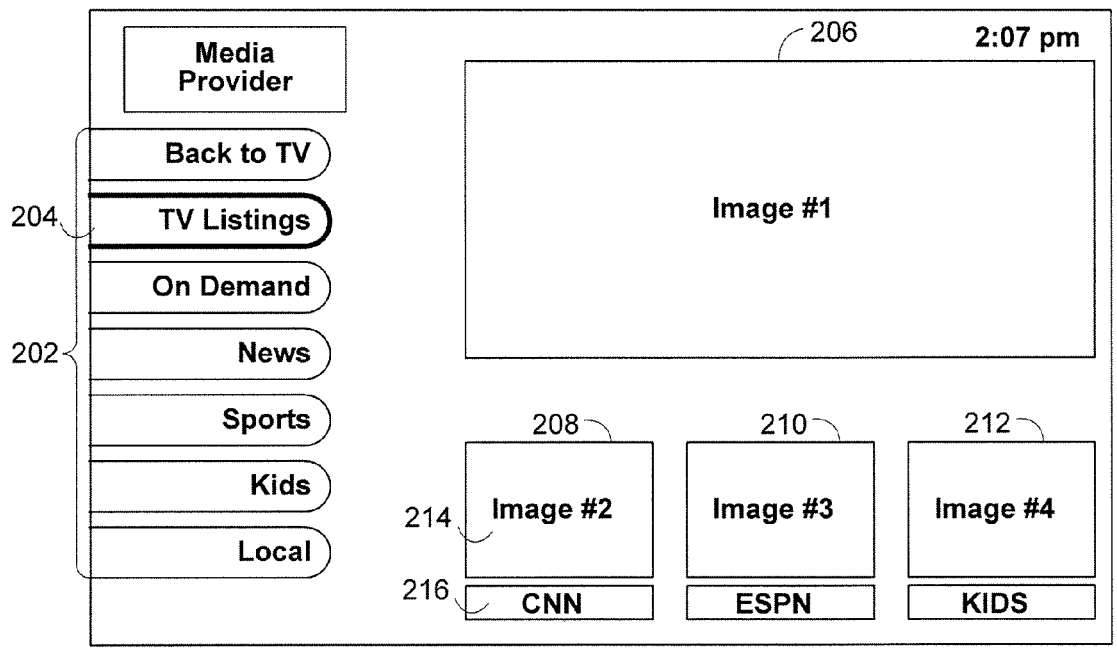

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
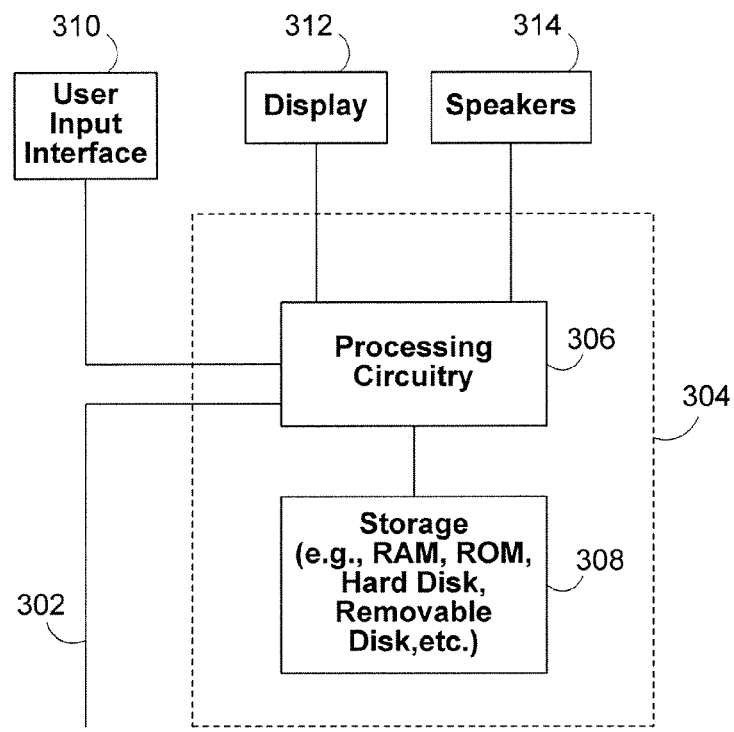
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308).

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

License files including information about the identity of the user and/or user equipment device 300 and media content access right and permission information may be stored on storage 308. The user or user equipment device 300 may be identified by a unique number. Media content authorization information may describe access rights to media content and permission information. Access rights may describe conditions of access to one or more media content. For example, authorization may be in terms of subscription to a grouping of media content that are provided by a media content service provider for a period of time, and may depend on the terms of a service agreement between a user and the copyright owner or distributor. For example, a user may be subscribed to access the entire television series of Battlestar Galactica or the user may be subscribed to a sports broadcast package that grants access to a number of pay-per-view shows or a number of sports channels.

License files may also include decryption keys for encrypted content. For example, encrypted music, video, or other content may be stored in storage 308 and a corresponding license file may be required to unlock the content and peruse it. It may not be possible to unlock the content without having possession of the corresponding license file. License files may also store a user's website-credentials. For example, the user's authentication information for a website like Hulu or Netflix may be encrypted and stored in storage 308. Control circuitry 304 may need to access the corresponding license file in order to decrypt the website-credentials stored in storage 308. Accordingly, in order to peruse the content or access the relevant website, on a device other than user equipment device 300, it may be necessary in to transfer the license file in tandem with the desired content and website-credentials. In some implementations, the license file may be stored on a server under the ownership of the copyright owner or distributor. In such instances, control circuitry 304 may retrieve the license file from the server when required.

Control circuitry 304 may include any suitable hardware and/or software to perform detection and identification operations. For example, control circuitry 304 may include infrared, optical, and/or radio-frequency receivers and/or transmitters to detect other user devices. Control circuitry 304 may additionally, or alternatively, include one or more microphone and/or camera to detect audible and/or visual information, respectively. The microphone may be capable of receiving sounds within the audible range and/or outside the audible range. The microphone may be omni-directional to allow determination of the direction of the audible signal. The camera may be capable of capturing information within the visual spectrum and/or outside the visual spectrum. For example, the camera may be able to capture infrared information, ultra-violet information, or any other suitable type of information and thus detect and/or identify another user device. Control circuitry 304 may additionally, or alternatively, include palm, fingerprint, and/or retinal readers for detecting and/or identifying user devices.

In some embodiments, control circuitry 304 may use any suitable method to determine the distance, trajectory, and/or location of another user device in relation to user equipment device 300. For example, control circuitry 304 may use received signal strength indication (RSSI) from a user's device to determine the distance the user is from another user device. For example, RSSI values may be triangulated to determine the location of the user's device. Control circuitry 304 may also use, for example, triangulation and/or time difference of arrival determination of appropriate information to determine the location of the user's device. For example, time difference of arrival values of sounds emanating from another user device may be determined. In some embodiments, an echo-location type system may be used to detect other user devices. For example, control circuitry 304 may instruct speakers 314 to transmit an audio signal that is imperceptible to human ears. The audio signal may carry information identifying the device uniquely. Other user devices that receive the audio signal may respond with an answer signal encoded with information identifying themselves. In some implementations, speakers 314 may transmit the audio signal on a first frequency and other devices and respond with an answer signal on a second frequency. The first frequency may be different from the second frequency. The time difference detected by control circuitry 304 between sending out the audio signal and receiving an answer signal may be used to determine the distance of the answering device. In some embodiments, any suitable image processing, video processing, and/or computer vision technique may be used to determine a user's distance, trajectory, and/or location in relation to another user device. A user's distance, trajectory, and/or location in relation to another user device may be determined using any suitable method. For example, control circuitry 304 may detect and identify devices corresponding to other users by using these techniques while other users are within a measurable distance from the user's device.

The measurable distance may be limited by ability of the detecting circuitry to resolve or measure features. For example, the measurable distance from which a camera may resolve two spaced points may be limited based on optical resolution of the camera. For example, the measurable distance from which a wireless antenna may be able to detect a received signal above background noise may depend on the initial intensity of the transmitted signal and an absorption coefficient of the surround transmission medium.

Control circuitry 304, by using wireless techniques, may also be capable of detecting and/or identifying a user or users based on recognition and/or identification of a media device (e.g., a mobile device, such as an RFID device or mobile phone) that may be associated with the user or users. Control circuitry 304 may recognize and identify such a device using any suitable means, for example, radio-frequency identification, Bluetooth, Wi-Fi, WiMax, internet protocol, infrared signals, any other suitable IEEE, industrial, or proprietary communication standards, or any other suitable electronic, optical, or auditory communication means. For example, control circuitry 304 may determine that a user is within a predetermined detection region of a media device, identify the user, and add the user to a list of active users at the media device. The detection and identification of users as described herein may not require any affirmative action on the part of the user beyond, in some embodiments, the configuration of such methods and systems. For example, any detection and identification of users may be done automatically by media devices.

In some embodiments, control circuitry 304 may determine a location based on global positioning system (GPS) measurements, or in the case of cellular telephones, measurements based on cell-tower signals. Control circuitry 304 may use these measurements to determine location coordinates which may be transmitted to other user devices or servers. Control circuitry 304 may include circuitry capable of determining the presence and/or the location of other user devices in its neighborhood. Any user device within a particular range of the user's device may be a neighboring device. In some implementations, control circuitry 304 may broadcast a message on a particular channel of a wireless network or any other suitable radio frequency enquiring whether there are any other devices within its range. Other devices within range of the user's device may, in response, send control circuitry 304 a message including information identifying themselves and indicating their geographic coordinates. In some implementations, devices may periodically broadcast a message or a beacon signal including information identifying themselves, their range, and their geographic coordinates. Control circuitry 304 may learn of devices that are its neighbors by receiving such periodically broadcast messages. In some implementations, control circuitry 304 may periodically (or continuously) use its proximity sensors to determine whether any other devices are present within its range. In some implementations, each device may periodically or continuously send its location information to a central server over the Internet. The central server may subsequently transmit the location information to all the devices present at a venue.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, gesture-sensing user interface, motion-sensing user interface, or other user input interfaces. User input interface 310 may communicate with one or more devices. In some embodiments, user input interface 310 may be a remote control with pressure-sensitive buttons. Control circuitry 304 may recognize different amounts of pressure applied to the pressure-sensitive buttons and adjust navigation through, for example, the guidance application. For example, the amount of pressure applied may adjust the speed of scrolling through guidance application listings, such that when less pressure is applied, the listings scroll more slowly and when more pressure is applied, the listings scroll more quickly. The pressure-sensitive buttons may control any portion of the guidance application or a media device in any suitable manner. In some embodiments, user interface 310 may be a touch screen with a pressure-sensitive surface. Control circuitry 304 may recognize different amounts of pressure applied to the pressure-sensitive screen and adjust navigation accordingly. For example, the amount of pressure a user applies to a flicking gesture may be indicative of the distance of the device indicated by the gesture. When more pressure is applied, the user may be indicating another device which is relatively far away from the user's device than when the user applied less pressure.

In some embodiments, user input interface 310 may be incorporated into a mobile device, such as a mobile phone. In such embodiments, user input interface 310 may obtain appropriate commands, information, and/or updates associated with a user or media device, or any other suitable information via the cellular phone network. In some embodiments, user input interface 310 may communicate with an intermediate device that may convert any suitable communication means to any other suitable communication means. For example, a user may attempt to scroll through a guidance application using the user's mobile phone incorporated with user input interface 310. User input interface 310 may output wireless packets to communicate with user's scroll instructions. An intermediate device may receive the wireless packets and in turn transmit infrared packets to control circuitry 304.

In some embodiments, user input interface 310 may store, transmit, and/or receive information associated with and/or identifying a particular user device. This information may be used by control circuitry 304 to detect and/or identify that the particular user device is within a predetermined detection region of the user's device. The user device may then be added to a list of active user devices at the user's device and/or logged into the user's device.

Control circuitry 304 may include processing circuitry capable of interpreting gestures or motion detected by sensors on-board user equipment device 300. Control circuitry 304 may include an accelerometer, a gyroscope, a magnetometer, or other similar circuitry capable of sensing and interpreting movements of user equipment device 300. Control circuitry 304 may also include a proximity sensor capable to detecting when other devices are in the vicinity of user equipment device 300. Display 312 may be provided as a stand-alone device or integrated with other elements of user equipment device 300. Display 312 may be one or more of a monitor, a television, a liquid crystal display (LCD) for a mobile device, touch screen, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Control circuitry 304 may receive signals from user input interface 312 corresponding to the user instructions received by user input interface 312. User instructions may be input using gestures performed by using one or more fingers or hands, using of physical movement of user equipment device 300, or using any other suitable gesture or motion. For example, users may swipe one or more fingers across user input interface 312 in a particular direction, perform a pinching or a spreading out action with one or more fingers on user input interface 312 in a particular direction, or physically move or shake user equipment device 300 in a particular direction. Control circuitry 304 may process the received user input to determine the direction associated with the user input. In some implementations, control circuitry 304 may store the received user input in storage 308 for future reference.

Control circuitry 304 may utilize the location information of the user's device and the direction determined based on the user's gesture to compute a vector matching the determined direction. The origin of the vector may be the coordinates of the user's device determined using location determination circuitry of control circuitry 304. Control circuitry 304 may make a comparison to check whether any user device in its neighborhood lie on the computed vector. Control circuitry 304 may identify another user device to be the device indicated by the user's gesture if the location of the other user device falls along the computed vector.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
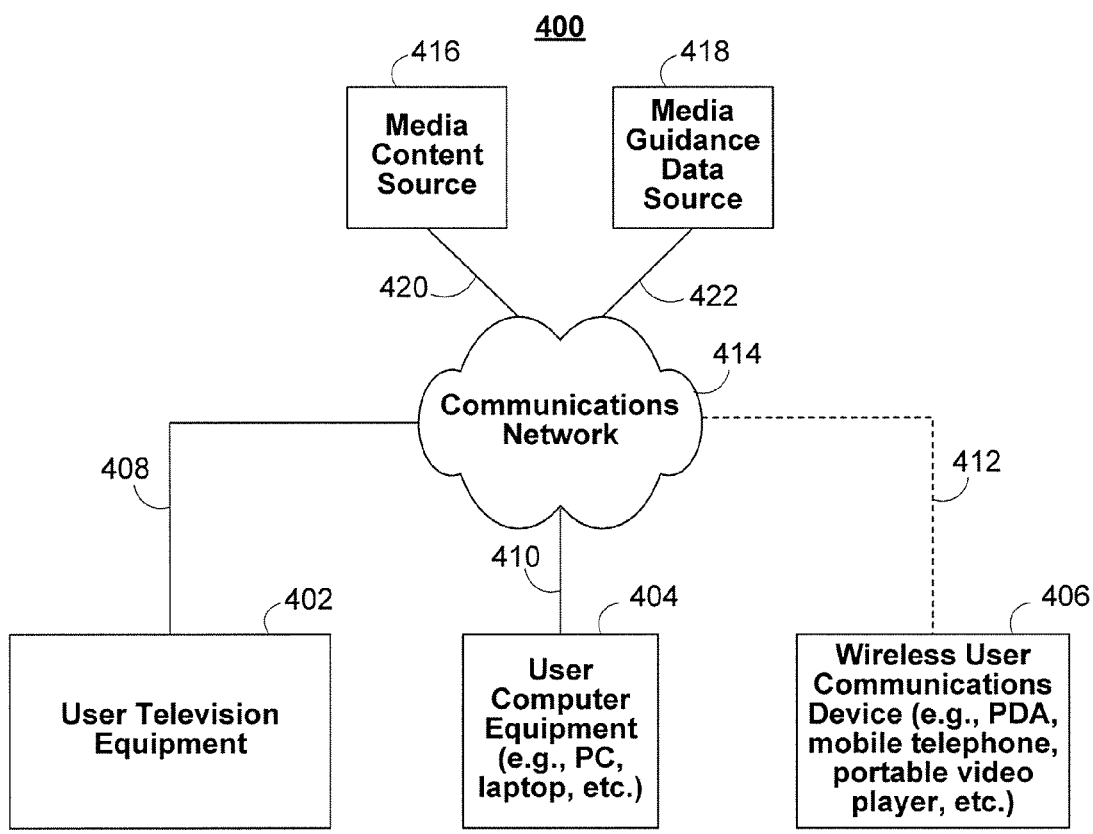
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, media content preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications or the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

For illustrative purposes, the present invention is described in the context of a venue where several users, each having a corresponding device, are present. For illustrative purposes, the present invention is described from the perspective of a user who wishes to transfer a setting from his or her mobile device to another user's mobile device. In some implementations, the user's mobile device may be user equipment device 300. The mobile devices of other users may be similar in terms or form and capability to user equipment device 300. However, it should be understood that the above and below teachings are equally applicable to any other venue and with other types of user devices. For example, not all the devices at the venue may be mobile devices.

In an illustrative embodiment, user equipment device 300 may be operated by John who has purchased a season pass from his cable provider to watch the Battlestar Galactica series on user equipment device 300. Bob, who happens to be John's friend, may visit John's house and may also wish to watch Battlestar Galactica on his own mobile device. Accordingly, John may select the Battlestar Galactica series on his device and may flick it towards Bob's device using a gesture. In response, John's device may select the setting authorizing viewing of the Battlestar Galactica series and send it to Bob's device. Bob may thus get authorization to also watch the Battlestar Galactica series from John's cable provider.

In some implementations, any other device within a particular range of the user's device may be a neighboring device. For example, when Bob's device is within a certain range of John's device, Bob's device may be considered to be a neighbor of John's device. In some implementations, the value of the range may be a pre-determined value stored in storage 308. In some implementations, for example, the value of the range may be a value up to 10 meters. In some implementations, the value of the range may be a variable parameter that is adjusted dynamically by control circuitry 304 based on performance feedback. In some implementations, the value of the range may be a parameter configurable by the user. A large value of the range may allow the user to transfer a setting to another device which is far away. At the same time, a large value of the range may make it more difficult to identify with precision the device to which the user wants to transmit the setting. In some implementations, another device may not automatically permit itself to be considered a neighboring device of the user's device even if it is located within range of the user's device unless it explicitly or implicitly grants such permission to the user's device.

In some implementations, each device may periodically or continuously send its location information to a central server over the Internet. In some implementations, the central server may subsequently transmit the location information to all the devices present at a venue. In some implementations, the devices may query the central server to determine the location information of any other devices present within their range. For example, the user's device may query the central server to determine its neighboring devices and the central server may respond with a message identifying all devices neighboring the user's device.

In some implementations, the user's device may learn of its neighboring devices without relying on the central server. In some implementations, control circuitry 304 of the user's device may broadcast a message on a particular channel of a wireless network or any other suitable radio frequency enquiring whether there are any other devices within its range. The broadcast message may include information identifying the user's device, the range of the user's device, and the geographic coordinates of the user's device. If any other devices within range of the user's device receive the message broadcast by the user's device, they may send the user's device a similar message including information identifying themselves and indicating their geographic coordinates. If devices outside the range of the user's device receive the message broadcast by the user's device they may ignore the message. Devices that receive the message broadcast by the user's device may determine whether they are within range of the user's device by computing their distance from the user's device and comparing the computed distance to the range of the user's device specified in the broadcast message. Devices may compute their distance from the user's device by using their own location information in conjunction with the geographic coordinates of the user's device specified in the broadcast message.

In some implementations, devices may periodically broadcast a message including information identifying themselves, their range, and their geographic coordinates. The user's device may learn of devices that are its neighbors by receiving such periodically broadcast messages. Control circuitry 304 of the user's device may extract relevant information from the message it receives to determine whether the device that transmitted the message is its neighbor.

In some implementations, the user's device may periodically (or continuously) use its proximity sensors to determine whether any other devices are present within its range. If the user's device detects that another device is indeed present within its range, it may transmit a message to the detected device requesting its location and identification information.

Figure 5:
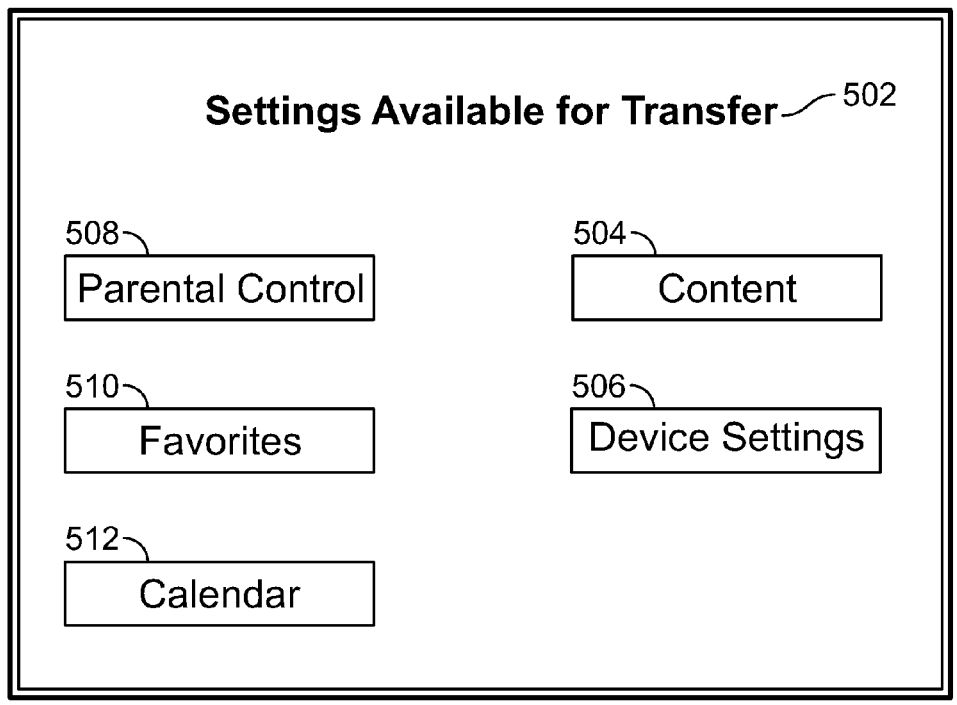
FIG. 5 shows an illustrative display screen that may be used to indicate categories of settings available for a user to transfer to another device in accordance with an embodiment of the invention.

FIG. 5 shows an illustrative display screen that may be used to indicate categories of media guidance application settings or data available for a user to transfer to another device in accordance with an embodiment of the invention. Control circuitry 304 may generate display screen 500 for display on the user's device automatically or responsive to a user request. In some implementations, control circuitry 304 may generate screen 500 for display on the user's device in response to detecting that another device is in proximity to the user's device. The detection of other devices may be performed automatically at one or more preset times. In some implementations, control circuitry 304 may generate display screen 500 in response to receiving a signal from user input interface 312 or other sensor circuitry corresponding to a user gesture. For example, the user may perform a swiping gesture on user input interface 312 or a gesture in three dimensional space using hands detected by a camera or infra-red sensor while perusing content on user equipment device 300. For example, control circuitry 304 may generate display screen 500 when John selects the Battlestar Galactica series on his device and flicks it towards Bob's device using a gesture.

In some implementations, title region 502 may indicate that display screen 500 displays categories of settings that are available for a user to select a setting from and transfer to another device. Categories of settings may be generated by control circuitry 304 based on settings that are available for transfer to another device. For example, categories of settings may include media content authorizations 504, device settings 506, parental controls 508, favorites 510, and calendar settings 512. Media content authorizations 504 may include settings related to media content including, but not limited to, pictures, music, videos, media content recommendations, channel and program favorites, programming preferences, and media content preferences. Media content authorizations 504 may be in form of license files. Device settings 506 may include settings that customize the user's device 300, like color scheme settings, display resolution settings, audio settings, and any other device customizable settings. Parental controls 508 may include settings that authorize or restrict the viewing of programs, channels, and/or websites on a user-based criterion. Favorites 510 may include settings related to the user's favorite channels, websites, or any other content. Calendar settings 512 may include settings related to appointments, meeting requests, or any other events. Other categories of settings may also be displayed on display screen 500. For example, other categories of settings may include contacts, recording scheduling, e-mail, game or chat requests, screenshots, bookmarks, and website credentials. Settings may be stored locally on storage 308. In the alternative, settings may be stored on a server from which the settings may be retrieved when required. Settings may also be stored in part locally and in part on a server.

In some implementations, any of the categories of settings displayed on display screen 500 may be user selectable. In response to user selection of a category of settings, control circuitry 304 may receive the user selection and in response display a further list of settings within the selected category of settings available for transfer.

In some implementations, control circuitry 304 may show display screen 500 in response to a user request to view setting categories. In some implementations, control circuitry 304 may show display screen 500 in response to a user selection of an item on display 100 of FIG. 1 or display 200 of FIG. 2.

Figure 6:
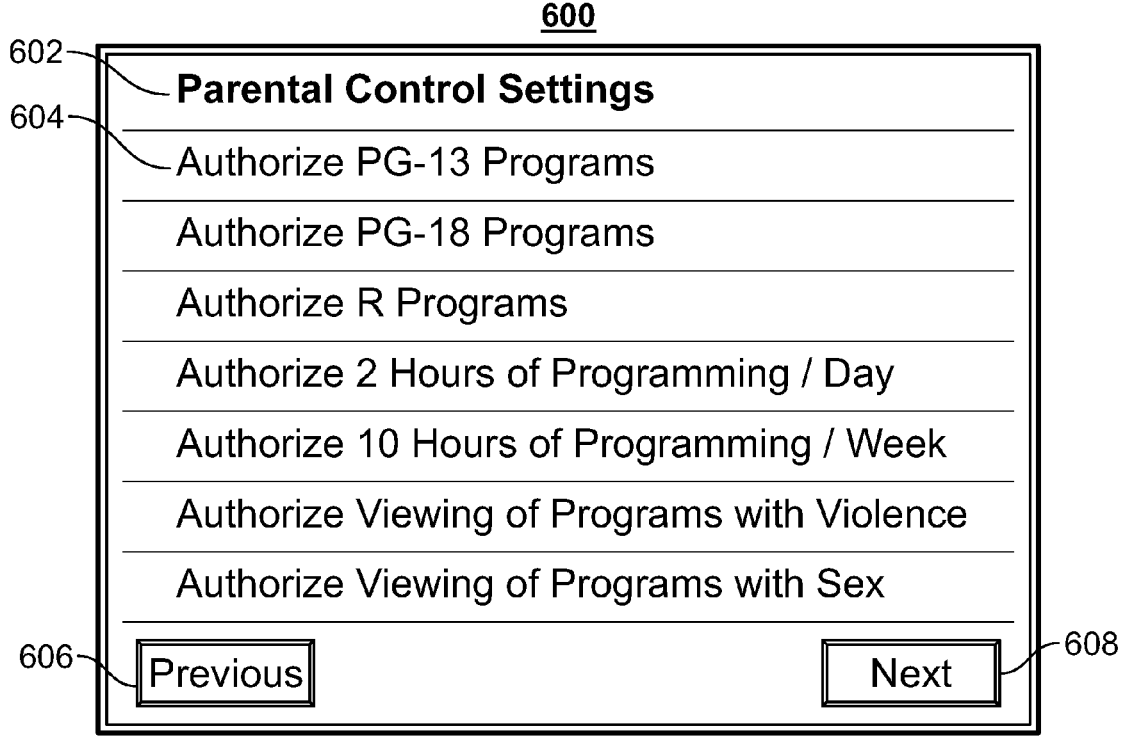
FIG. 6 shows an illustrative display screen that may be used to indicate settings within a particular category of settings available for a user to transfer to another device in accordance with an embodiment of the invention.

FIG. 6 shows an illustrative display screen that may be used to indicate settings within a particular category of settings available for a user to transfer to another device in accordance with an embodiment of the invention. In some implementations, display screen 600 may include title region 602, display region 604, and navigation icons 606 and 608. Display region 604 may provide a comprehensive or partial list of settings available within a category of settings available for the user to select and transfer to another device. In some implementations, display region 304 may list only the most frequently used settings within a category.

For purposes of illustration and not of limitation, title region 602 of FIG. 6 shows an example where the user selected the category of parental control settings on display screen 500. Accordingly, display region 604 lists parental control settings. Parental control settings may include, for example, restricted television programs, restricted program titles, restricted channels, restricted ratings, restricted actors, restricted producers, restricted musical artists, restricted sponsors, restricted metadata terms, restricted themes, restricted genres, restricted categories, restricted time periods, restricted limits for purchasing content, and/or any other suitable restrictions.

In some implementations, parental control settings displayed in display region 604 may be limited to settings that are transferable to other devices. A setting may be transferable if the user has authorization to transfer the setting. For example, the user's device may be authorized to view PG-13 and PG-18 rated media content but not R rated media content. Accordingly, user may transfer settings corresponding only to viewing of PG-13 and PG-18 rated media content but not the setting corresponding to R rated media content. In this case, display region 604 may display settings corresponding only to viewing of PG-13 and PG-18 rated media content. In some implementations, the user's device may be authorized to transfer settings corresponding to viewing of media content containing violence, sex, coarse language, and/or any other media content identifier. In some implementations, the user's device may be authorized to view media content for only a limited number of hours in a given time period. For example, the user's device may be restricted to viewing two hours of programming per day or ten hours of programming per week. The user may be able to transfer this setting to other devices. Settings displayed in display region 604 when the user selects a settings category other than parental control settings on display screen 500 may similarly be limited to settings that are transferable.

In some implementations, settings may be stored locally on the user's mobile device. In some implementations, settings may be stored on a remote server and retrieved when required. In some implementations, settings may be generated when required if they did not previously exist.

Display region 604 may display media content authorizations that are transferable to other user devices if the user selects the category of media content authorizations on display screen 500. In some implementations, the user's mobile device may be authorized to view a particular television series, like Battlestar Galactica. In some implementations, the user's mobile device may have authorization to view and/or record particular on-demand content. On-demand content may include a variety of media content like television programming and pay-per-view content. In some implementations, the user's mobile device may have authorization to listen to or stream music content.

In some implementations, media content authorizations may be stored as license files in storage 308. License files may include information about the identity of the user and/or device and media content access right and permission information. The user or device may be identified by a unique number assigned to identify the user. Media content authorization information may describe access rights to media content and permission information. Access rights may describe conditions of access to one or more media content. For example, authorization may be in terms of subscription to a grouping of media content that are provided by a media content service provider for a period of time, and may depend on the terms of a service agreement between a user and the copyright owner or distributor. For example, a user may be subscribed to access the entire television series of Battlestar Galactica. For example, the user may be subscribed to a sports broadcast package that grants access to a number of pay-per-view shows or a number of sports channels. When a user elects to transfer an authorization enabling access the entire television series of Battlestar Galactica, control circuitry 304 may retrieve the corresponding license file from storage 308 and transfer the license file. Accordingly, if the user is transferring an authorization enabling another user to access the television series Battlestar Galactica, the authorization may be effective on the device the authorization is transferred to only for the duration based on the subscription of the user who transferred the setting.

License files may also include decryption keys for encrypted content. For example, encrypted music, video, or other content may be stored in storage 308 and a corresponding license file may be required to unlock the content and peruse it. It may not be possible to unlock the content without having possession of the corresponding license file. License files may also store a user's website credentials. For example, the user's authentication information for a website like Hulu or Netflix may be encrypted and stored in storage 308. Control circuitry 304 may need to access the corresponding license file in order to decrypt the website credentials stored in storage 308. Accordingly, in order to peruse the content or access the relevant website, on a device other than user equipment device 300, it may be necessary to transfer the license file in tandem with the desired content and website credentials. In some implementations, the license file may be stored on a server under the ownership of the copyright owner or distributor. In such instances, control circuitry 304 may retrieve the license file from the server when required.

Display region 604 may display website-credential settings that are transferable to other user devices if the user selects the category of website credential settings on display screen 500. In some implementations, the user's mobile device may be authorized to access media content on websites like Hulu, Netflix, ESPN, etc. Generally, such websites offer subscribers the opportunity to view media content online based on the subscription package that the user purchases. Access to media content available through such websites is controlled using website credentials which may include a username and password combination, biometric identifiers, encryptions keys, and the like. In some implementations, these website credentials may be stored locally on the user's mobile device for user convenience.

Display region 604 may display favorite channel settings that are transferable to other user devices if the user selects the category of favorite channel settings on display screen 500. For example, the user may mark certain channels as favorites manually, control circuitry 304 may automatically mark channels as favorites based on the user's viewing preferences and/or habits, or a central server may suggest channels to mark as favorites based on popular ratings. Accordingly, display region 604 may display favorite channels settings that the user's mobile device has authorization for and are transferable to other user devices. In some implementations, the user's mobile device may be authorized to view the favorite channels of another user.

Display region 604 may display recording scheduling settings that are transferable to other user devices if the user selects the category of recording scheduling settings on display screen 500. In some implementations, the user's mobile device may be authorized to record broadcast, on-demand, and/or pay-per-view media content. In some implementations, the user may setup media content to be recorded automatically based on a schedule.

Display region 604 may display calendar, contact, e-mail, reminder, screenshot, bookmark, or text message settings that are transferable to other user devices if the user selects one of the above categories of settings on display screen 500. For example, the user's device may be authorized to view e-mails and text messages from a particular sender and may have authorization to share the e-mails and text messages with other users. Calendar settings may include events, reminders, tasks, appointments, and other calendar markers. Contact settings may include a list of the user's contacts. Each contact entry may include information regarding the person or organization associated with the contact entry. Reminder settings may include details about events or tasks. Screenshot settings may include information regarding the portion of the screen that is sharable by the user. Bookmark settings may include tags associated with websites, audio, video, or other media content.

In some implementations, display screen 600 includes navigation icons 606 and 608 which enable a user to navigate between the settings shown in display region 604. In some implementations, control circuitry 304 may receive a user selection of navigation icons 606 and 608 selected using user input interface 312. Once the user has decided on a setting to transfer to another device, control circuitry 304 may receive a user selection of that setting using user input interface 312. In some implementations, the setting selected by the user may be marked by control circuitry 304 for easy user identification. For example, the selected setting may be highlighted, marked using icons, displayed in a separate window, or visually distinguished in any other suitable manner.

In some implementations, the user may choose to associate additional restrictions with the setting selected for transfer. Control circuitry 304 may generate and display an option for the user to associate restrictions with the selected setting. For example, the user may stipulate that the setting may only be valid on the device to which is it transferred for a period of time determined by the user. The user may stipulate that the setting may not be transferred to a further third user device. The user may stipulate that the setting may only be transferred to a limited number of users (where the number of users may be configurable by the user or may be determined automatically based on access rights) other than the user to whom the setting was originally transferred. If the setting pertains to access rights for recording on-demand media content, for example, the user may stipulate that the user who receives the setting may only view on-demand content but not record it. If the setting pertains to an e-mail, calendar event, reminder, text message, or a media content, the user may stipulate that the user who receives the setting may only view the setting once. For example, the setting may automatically be deleted from the recipient's device after the recipient has viewed the setting. The user may also choose to associate any other suitable restriction to the setting selected for transfer.

In some implementations, control circuitry 304 may retrieve information associated with the setting the user selected from display screen 600. For example, control circuitry 304 may query an internal database, implemented using SQL or any other suitable database programming language, to retrieve relevant setting information. Control circuitry 304 may also retrieve access right information from a media server if necessary. Control circuitry 304 may further prepare the retrieved information for transfer by generating a message encapsulating the setting information to be transferred.

FIG. 7 illustrates an example of a message that may be transferred from the user's device to another device in accordance with an embodiment of the invention. The message may carry information about the identity of the user and information corresponding to the setting being transferred. The message may include user profile information section 710 containing user profile data 720. In some implementations, depending on the setting being transferred, the message may include section 730 that contains access right and permission information. Section 730 may include access right information for media content 740, 750, and 760.

User profile information section 710 is used to identify the user. Section 710 may include descriptive information 720 about a user such as user ID number, name, gender, and age. The user ID number may be a unique number assigned to identify a user. Examples of such ID numbers may include national identity card numbers, social security numbers, passport numbers, or a hash code generated from the full name and birth date of the user.

Section 730 may include content authorization information which describes access rights to media content and permission information. The access rights may describe conditions of access to one or more media content. The term subscription may refer to any grouping of media content that is provided by a media content service provider for a period of time, and that depend on the terms of a service agreement between a user and the copyright owner or distributor. For example, a user may be subscribed to access the entire television series of Battlestar Galactica. For example, the user may be subscribed to a sports broadcast package that grants access to a number of pay-per-view shows or a number of sports channels. Accordingly, if the user is transferring the setting authorizing another user to access the television series Battlestar Galactica, the authorization may be effective on the device the setting is transferred to only for the duration based on the subscription of the user who transferred the setting.

Subscription information may include an ID number of the user, an account number with a service provider, a duration of the subscription, and a hash code. The ID number may be used to verify the identity of the user and the account number may be used to verify the services subscribed by the user. The duration may indicate the length of the subscription from a start date of service, expiration date of the service, time remaining available in the subscription, any other suitable duration information or any combination thereof. The hash code may be a unique number assigned to the user that is compared with a value stored on a central server. The hash code is only valid for the duration of the subscription. After the subscription has expired, the user will need to renew the subscription and obtain a new hash code in order to continue maintaining access to the subscribed services. Possession of the information listed above will enable the device to which the setting is being transferred to access the media content with which the setting is associated.

Listing 740 is an example of an access right for a media content described by metadata, which may include information that describes a media content such as the content type, title, genre, composer, author, performer, file size, and time length of the media asset. Listing 740 provides an example access right described by metadata. The listing describes a media content having a content type 741 of movie, title 742 of "War of the Worlds," and genre 743 of sci-fi. Hash codes may be used to securely protect metadata stored in plain text from tampering by unauthorized users. Hash codes may also provide a layer of protection securing the message as it is being transmitted to another device. For example, hash codes may prevent a third party who is in the vicinity of the transmission from covertly modifying the message or from intercepting the message.

In some implementations, control circuitry 304 may compute the hash code 744 as the result of hashing a concatenation of the metadata 741-743, using a hashing algorithm only usable by control circuitry 304 of the user's mobile device. Modification of the plain text metadata in listing 740 without modification of the hash code would corrupt the information in the listing 740. When control circuitry 304 of the user's mobile device or of the device the setting is transferred to retrieves the content authorization information for the user, including access right listing 740, it can verify whether the listing has been compromised, by re-computing the hash code based on metadata 741-743, and comparing with hash code 744. If the computed and stored hash code match, control circuitry 304 determines that the user is authorized to access the media content corresponding to listing 740. If the hash codes do not match, control circuitry 304 determines that the user is not authorized to access the media content, and may invoke a penalty on the user, such as a fine, or revocation of all access rights in the content authorization information of the user.

Listing 750 is an example of an access right for a media content described without metadata. Listing 750 includes an ID number 751, hash code 752, date stamp 753, and time stamp 754. ID number 751 may be a unique ID number for the media asset. Date stamp 753 and time stamp 754 may indicate a date and time at which the access right expires. Hash code 752 may be a hashed value of an ID number, date information, time information, user profile information, any other suitable content authorization information or subscription information or any combination thereof. The hash code may prevent against tampering of the access right.

Listing 760 is an example of an access right for accessing a channel. The listing may include subscription term 761, which indicates the duration of the subscription. Other variants of 761 may include one-time, annual or seasonal. Hash code 762 may be a hashed value of an ID number, date information, time information, user profile information, any other suitable content authorization information or subscription information or any combination thereof. In this case, only the hashed value is stored to reduce the amount of information about the access right that needs to be stored or transmitted. It should be understood that other variants and combinations of the information described previously may also be used to describe access rights to media content.

In some implementations, message 700 may also include fields (not shown) for encapsulating a setting directly. For example, if the user wants to transfer an e-mail, text message, reminder, calendar event, bookmark, screenshot, media content recommendation, and game request setting, or any other setting related to an individual data item, message 700 may include a data structure or a field to contain the relevant setting.

Figure 8B:
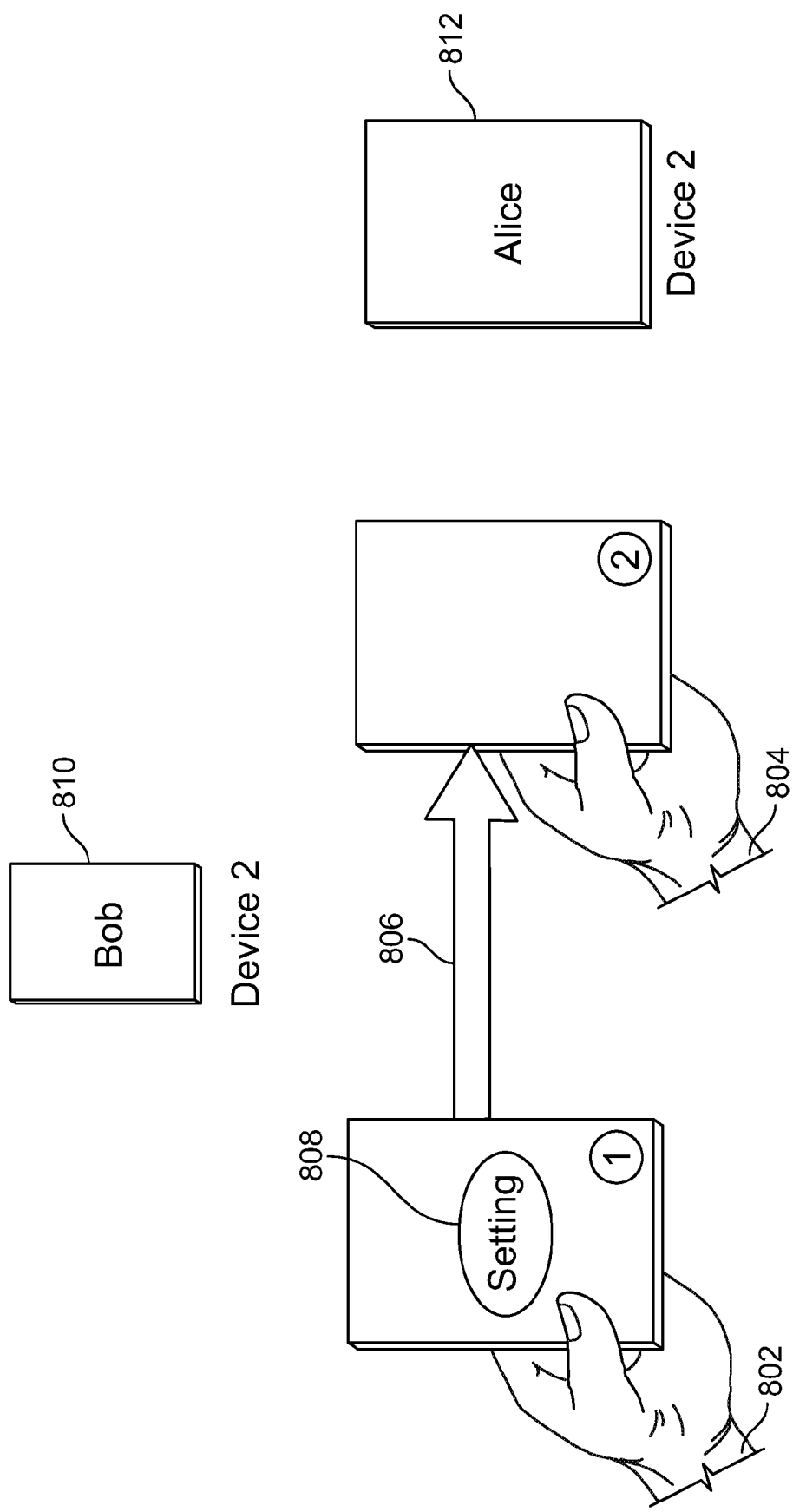

FIGS. 8(*a*) and 8(*b*) show two illustrative methods for transferring a setting from a first device to a second device indicated by a user gesture in accordance with an embodiment of the invention. FIG. 8(*a*) is an illustration of one scenario in which the user is present at a venue with other users. Each of the other users may have a corresponding device. For example, two of the user's friends Bob and Alice, each having devices 810 and 812, respectively, may be at the venue with the user. For example, the user, John, may be located at coordinates ($x_J$, $y_J$, $z_J$), Bob may be located at coordinates ($x_B$, $y_B$, $z_B$), and Alice may be located at coordinates ($x_A$, $y_A$, $z_A$), where coordinates ($x_J$, $y_J$, $z_J$), ($x_B$, $y_B$, $z_B$), ($x_A$, $y_A$, $z_A$) are mutually different from each other. The coordinates corresponding to the location of each device may be denoted by a 3-tuple. In some implementations, control circuitry 304 may receive a user selection of a setting from display screen 600 and may prompt the user to perform a gesture using, for example, a hand, to indicate the device to which the setting should be transferred.

In some implementations, control circuitry 304 may detect that user has pressed down on a setting shown on display screen 600 using a finger and has performed a swiping action dragging the setting in the direction of the device the user would like to transfer that setting to. Control circuitry 304 may receive the user selection of the setting from display screen 600. Control circuitry 304 may receive the user input registered by user input interface 312 and may process the received user input to determine the direction the user is gesturing in. In some implementations, control circuitry 304 may store the received user input in storage 308 for future reference. For example, John may have authorization to view the entire Battlestar Galactica series on-demand and may desire to allow his friend, Bob, to also be able watch the same series. To accomplish this, John can navigate to the setting corresponding to authorization to watch Battlestar Galactica from display screen 600, then press down on the setting using his finger and simultaneously drag his finger in the direction in which Bob is located relative to John—starting from position 802, John may drag setting 808 in direction 806 to position 804. User input interface 312 may register such a user input and may transmit a signal generated based on the registered user input to control circuitry 304. In the event that Bob is located to the right of John, direction 806 may be towards the right of starting position 802. It will be understood that direction 806 may change accordingly based on the location of Bob's device relative to the location of John's device.

FIG. 8(*b*) is another illustrative method for transferring a setting from a first device to a second device based on a user gesture in accordance with an embodiment of the invention. Continuing the above example, in some implementations, control circuitry 304 may receive a selection of a setting from display screen 600 that John may desire to transfer to Bob and control circuitry 304 may further receive a user input indicative of the direction in which Bob is located based on John shaking his mobile device in the relative direction in which Bob is located. In some implementations, control circuitry 304 may detect the user's device being shaken back and forth in a direction several times. Control circuitry 304 may receive a signal from a sensor, like an accelerometer, that senses the gesture or motion the user makes with his device. Control circuitry 304 may then process the signal to determine the direction indicated by the gesture, as discussed further below. In some implementations, the vigor with which John shakes his mobile device may not be as critical as the direction in which he shakes his mobile device. It will be understood that the invention is not limited to the gestures described above. Any other suitable gestures or combination thereof may also be used. In some implementations, the direction associated with the physical movement of the mobile device may be registered by control circuitry 304 using position information circuitry or an accelerometer.

In some implementations, the target device (e.g., Bob's device) to which John wants to send a selected setting may not be in the same room as John. For example, Bob may be in a room directly above or below the room where John is located. Accordingly, John may turn his device perpendicular to the floor of the room and make a gesture upwards or downwards on user input interface 312. For example, control circuitry 304 may detect the orientation of the user's device relative to floor of the user's location or some other reference point and subsequently detect movement of the device along or perpendicular to the previous orientation. The direction of the movement and the orientation of the device may indicate the direction to send the setting in. For example, orienting the user's device perpendicular to the floor and moving the device upwards may indicate that the user desires to transfer a selected setting to another device located in a room above the user. Control circuitry 304 may detect that orientation of user equipment device 300 via the gyroscope or other suitable sensor. Control circuitry 304 may receive a signal from user interface circuitry 312 that is generated based on the registered user input.

In some implementations, control circuitry 304 may receive signals corresponding to gestures not made directly in contact with user equipment device 300. For example, gestures could be made in three dimensional space. For example, John could be perusing content on user equipment device 300 in the living room and might hold out his hands toward user equipment device 300 with fingers outspread, make pinching motion as if to grab a setting, and move his hand in the direction of the user device he wants to send the setting to. The camera in user equipment device 300 may detect the user's gesture. Control circuitry 304 may receive a signal from the camera corresponding to the detected gesture. In some implementations, the user may perform a gesture in relation to a reference point.

In some implementations, control circuitry 304 may receive signals corresponding to multiple gestures from the user, where each gesture may correspond to a different direction, instructing control circuitry 304 to transfer the selected setting to devices present in each of the gestured directions. For example, John may be present at a venue with both Bob and Alice and he may wish to share a setting with both Bob and Alice. Accordingly, John may first perform a gesture in Bob's direction followed by a gesture in Alice's direction.

In some implementations, once control circuitry 304 has registered the direction in which the user wishes to transmit the selected setting in, control circuitry 304 may proceed to determine the device present in the direction indicated by the user. In some implementations, control circuitry 304 of the user's device may know or may learn the locations of neighboring devices associated with other users as discussed above.

In some implementations, control circuitry 304 may utilize the location information of the user's device and the direction registered based on the user's gesture to compute a reference vector matching the registered direction. The origin of the reference vector may be the coordinates of the user's device.

The reference vector may be a vector of coordinates where each entry of the reference vector is a coordinate that lies along the registered direction. The first entry of the reference vector, the origin, may be the coordinates $(x_J, y_J, z_J)$ of the user's device. The coordinate in each subsequent entry of the reference vector may be a pre-determined distance away from the coordinate at the previous entry of the reference vector. For example, the reference vector may have the form $[(x_J, y_J, z_J), (x_2, y_2, z_2), (x_3, y_3, z_3), \ldots, (x_n, y_n, z_n)]$, where n is a positive integer. The distance between any two consecutive entries of the reference vector, e.g., $(x_2, y_2, z_2)$ and $(x_3, y_3, z_3)$, may be a pre-determined value. The distance may be a Euclidean distance value. The reference vector may be stored in storage 308. The coordinate in the last entry of the reference vector may be at a pre-determined distance away from the coordinate in the first entry of the reference vector, i.e., $(x_J, y_J, z_J)$ may be a pre-determined distance away from $(x_n, y_n, Z_n)$.

Control circuitry 304 may make a comparison to check whether any of its neighboring devices lie on the computed reference vector. For example, control circuitry 304 may determine whether the coordinates $(x_B, y_B, z_B)$ of Bob's device match one of the entries of the reference vector. In the alternative, control circuitry 304 may determine whether the distance between $(x_B, y_B, z_B)$ and any one of the entries of the reference vector is less than a threshold distance. If the distance between $(x_B, y_B, z_B)$ and any one of the entries of the reference vector is indeed less than the threshold distance then control circuitry 304 may determine Bob's device located at coordinates $(x_B, y_B, z_B)$ to be located in the direction indicated by the user, i.e., the location of Bob's device may match the direction indicated by the user. If a single match is detected, then control circuitry 304 has identified the target device to which the user wishes to transmit the setting selected using display screen 600. If multiple matches are detected, then control circuitry 304 may display the detected devices on display 312 and prompt the user to select the device(s) to which the user would like to transfer the setting selected using display screen 600. The user may select the intended target device(s) from the list of detected devices displayed.

In some implementations, control circuitry 304 may utilize the location information of the user's device and the direction registered based on the user's gesture to compute a first vector at an angle above the registered direction in two dimensional space. The origin of the first vector may be the coordinates of the user's device. In some implementations, the value of the angle may be a pre-determined value. In some implementations, for example, the value of the angle may be a value up to 30 degrees. In some implementations, the value of the angle may be a variable parameter that is adjusted dynamically by control circuitry 304 based on performance feedback. In some implementations, the value of the angle may be a parameter configurable by the user. A large value of the angle may allow the user to indicate the device to which the user wishes to transmit the selected setting using a gesture whose direction may not be very precise. At the same time, a large value of the angle may make it more difficult to identify with precision the device to which the user wants to transmit the setting if the user's device has a large number of neighboring devices. On the other hand, a small value of the angle may require the user to make the gesture more precise but may result in easy identification of the device to which the user wishes to transmit the setting even if the user's device has a large number of neighboring devices.

In some implementations, control circuitry 304 may also compute a second vector at an angle below the registered direction in two dimensional space. The origin of the second vector may also be the coordinates of the user's device. The first and the second vectors may be used by control circuitry 304 to define the upper and lower boundaries of a circular sector whose origin is the coordinates of the user's device and whose radius is the range of the user's device. Control circuitry 304 may use the circular sector defined in this manner as the space within which to search for devices the user has gestured he or she wishes to transmit the selected setting to. For example, the circular sector may define a set of coordinates within which the device the user has gestured he or she wants to transmit the selected setting to may lie. Accordingly, control circuitry 304 may check whether the coordinates (obtained from location information) of any of its neighboring devices lie in the circular sector. If control circuitry 304 determines that the coordinates of a single device lie in the circular sector, then control circuitry 304 may have successfully identified the target device to which the user wishes to transmit the selected setting. If multiple matches are detected, then control circuitry 304 may display the detected devices on display 312 and prompt the user to select the device(s) to which the user would like to transfer the setting selected using display screen 600. The user may select the intended target device(s) from the list of detected devices displayed.

In some implementations, control circuitry 304 may compute multiple vectors where each of the computed vectors is at an angle around the registered direction in three dimensional space. The origin of these vectors may be the coordinates of the user's device. Each of these vectors may be used by control circuitry 304 to define the boundaries of a circular cone whose origin is the coordinates of the user's device and whose radius is the range of the user's device. Control circuitry 304 may use the circular cone defined in this manner as the space within which to search for devices the user has gestured he or she wishes to transmit the selected setting to. For example, the circular cone may define a set of coordinates within which the device the user has gestured he or she wants to transmit the selected setting to may lie. Accordingly, control circuitry 304 may check whether the coordinates (obtained from location information) of any of its neighboring devices lie in the circular cone. Any other multi-dimensional vector analysis tools may also be used to determine the location of a target device(s).

In some implementations, control circuitry 304 may simply transmit the direction registered based on the user's gesture to the central server. In response, the central server may identify the target device(s) the user wishes to transmit the selected setting to and send information identifying the target device to control circuitry 304.

Figure 9:
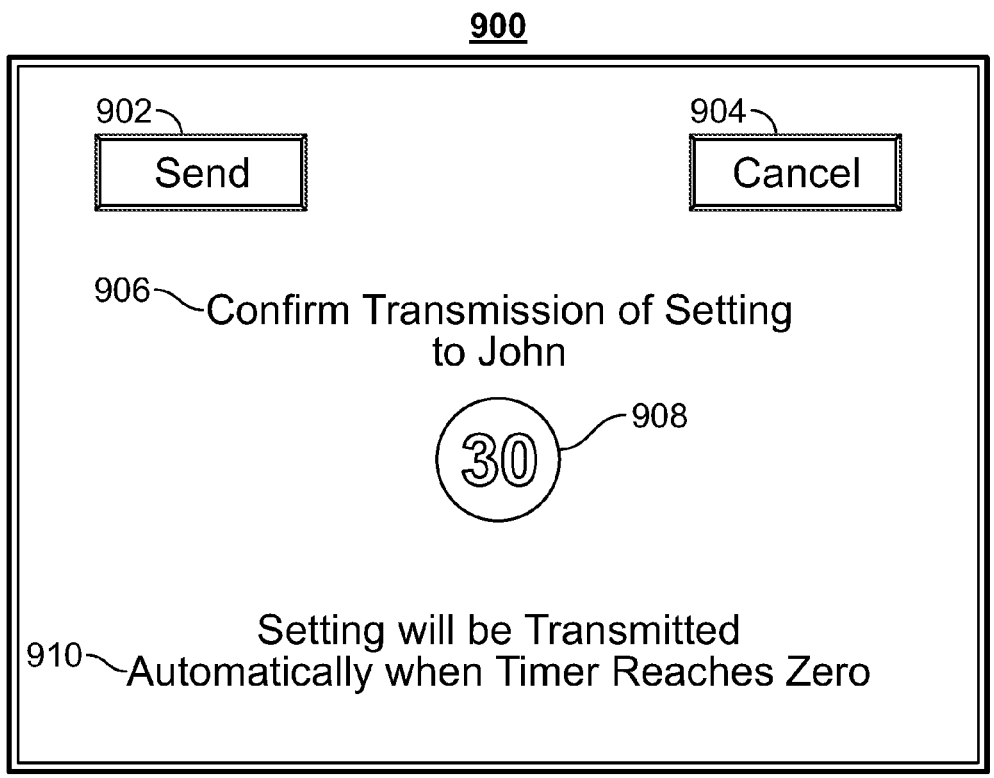
FIG. 9 shows an illustrative display screen that may be displayed to the user to confirm that the user wishes to transfer the selected setting to an identified device in accordance with an embodiment of the invention.

FIG. 9 shows an illustrative display screen that may be displayed to the user to confirm that the user wishes to transfer the selected setting to an identified device in accordance with an embodiment of the invention. In some implementations, control circuitry 304 may prompt the user to confirm that the user wishes to transmit the selected setting to the identified target device(s). Control circuitry 304 may prompt the user using display screen 900. In some implementations, display screen 900 may include send icon 902, cancel icon 904, title region 906, counter 908, and information region 910.

In some implementations, title region 906 may indicate the name of the user of the target device identified by control circuitry 304. In this way, display screen 900 may serve to confirm that control circuitry 304 has correctly identified the device to which the user wishes to transmit the selected setting.

In some implementations, control circuitry 304 may receive confirmation that the device to which the user wishes to transmit the selected setting has been correctly identified when send icon 902 is selected. Control circuitry 304 may receive a signal corresponding to the user confirmation. In response, control circuitry 304 may generate message 700 according to the setting selected by the user, establish communication with the identified target device, and transmit message 700 to the identified target device once communication with it has successfully been established. In some implementations, control circuitry 304 may transmit the generated message 700 corresponding to the selected setting to the identified target device in response to the selection of send icon 902 by the user. In some implementations, control circuitry 304 may delay the transmission of the generated message 700 corresponding to selected setting to the identified target device by a pre-determined time after the selection of send icon 902 by the user. In some implementations, control circuitry 304 may wait until a preset time to transmit the generated message 700 corresponding to selected setting to the identified target device.

In some implementations, control circuitry 304 may receive an instruction to cancel the transmission when cancel icon 904 is selected. The user may chose to cancel the transmission of the selected setting to the identified target device if, for example, control circuitry 304 did not identify correctly the device to which the user gestured he or she wished to transmit the selected setting to. The user may also choose to cancel the transmission of the selected setting if the user changes his or her mind about transferring the setting to the identified target device.

In some implementations, counter 908 may countdown sequentially from a starting value and if no user input is received via send icon 902 or cancel icon 904 before counter 908 reaches a value of zero, control circuitry 304 may transmit the generated message 700 corresponding to selected setting to the identified target device. In some implementations, the starting value of counter 908 may be a preset value. In some implementations, the starting value of counter 908 may be a user configurable parameter. In some implementations, counter 908 may behave substantially like a timer, decrementing the value it displays once every second. In some implementations, information region 910 may inform the user that the selected setting may be transmitted to the identified device automatically if no user confirmation or cancellation is received before the value displayed by counter 908 reaches zero.

In some implementations, control circuitry 304 may transmit the generated message 700 corresponding to selected setting to the identified target device over a direct communication link. In some implementations, devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path via communications network 414. For example, control circuitry 304 may transmit the selected setting to the identified device over any of the communications paths discussed above. In some implementations, control circuitry 304 may transmit the selected setting to the identified device over a wireless network.

In some implementations, control circuitry 304 may transmit the selected setting to the identified target device using web services. For example, control circuitry 304 may transmit the selected setting to a web server which subsequently forwards the setting to the identified target device. Similarly, control circuitry 304 may transmit the selected setting to any other intermediary device which in turn forwards the selected setting to the identified target device. For example, control circuitry 304 may transfer the setting to the identified target device using cloud-based services. In some implementations, control circuitry 304 may transmit the selected setting to the identified target device over the Internet. In some implementations, control circuitry 304 may instruct the identified target device to retrieve the selected setting from a server.

In some implementations, control circuitry 304 may transmit the selected setting to all user devices in its neighborhood. In its transmission, control circuitry 304 may include other information such as its coordinates and the direction of transmission, i.e., registered direction (as indicated by the user via a gesture). User devices that receive the transmission may determine individually whether they are located along the direction of transmission. If a user device determines that it is located along the direction of transmission, it may save the received setting and send a confirmation message to control circuitry 304 indicating that it has received the setting. If a user device determines that it is not located along the direction of transmission, it may ignore the received transmission. Such an implementation reduces the computing burden of control circuitry 304 because each device simply needs to make its own determination as to whether it is located along the direction indicated by the user. This may be beneficial when many user devices are present at a venue.

Figure 10:
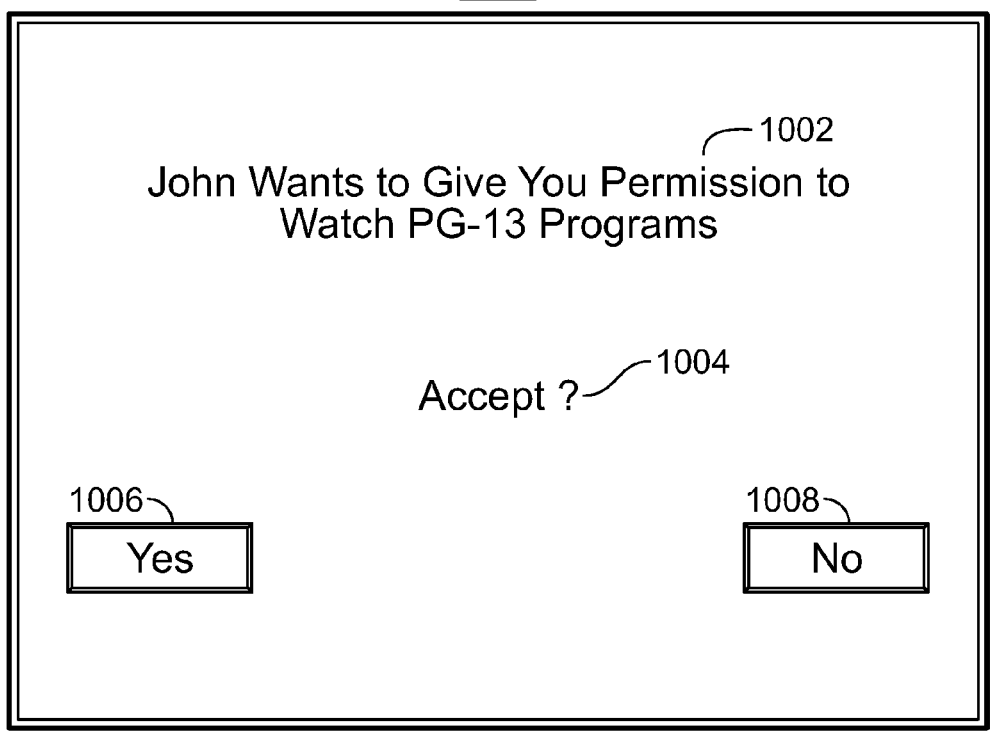
FIG. 10 shows an illustrative display screen that may notify the user at the target device of an incoming setting transfer and prompt the user to accept the transfer in accordance with an embodiment of the invention.

FIG. 10 shows an illustrative display screen that may notify the user at the target device of an incoming setting transfer and may prompt the user to accept the transfer in accordance with an embodiment of the invention. In some implementations, display screen 1000 may include information region 1002, information region 1004, icon 1006, and icon 1008.

In some implementations, when control circuitry 304 of the user's device transmits the selected setting to the identified target device, the user of the target device may be given an opportunity to accept or to decline the transfer using display screen 1000. In some implementations, information region 1002 may include information identifying the user of the device from which the transfer originates. In some implementations, information region 1002 may also include information regarding the setting that is being transferred. For example, information region 1002 may display the text "John wants to give you permission to watch PG-13 programs." Information region 1002 may include graphics, text, or any suitable combination thereof.

In some implementations, information region 1004 may include a suitable combination of graphics and text and may prompt the user of the target device to accept the setting being transferred. In some implementations, the user of the target device may select icon 1006 to accept the transfer of the setting. In some implementations, the user of the target device may select icon 1008 to decline the transfer of the setting. Icons 1006 and 1008 may include text, graphics, other visual indicators, or suitable combination thereof.

In some implementations, the user of the target device may have the option (not shown) to request additional information about the setting being transferred. For example, if the setting pertains to access rights for the Battlestar Galactica series, the user of the target device may like to know the duration for which he or she may have access to the series. Upon request for such additional information, control circuitry 304 of the target device may send an appropriate query to the device from which the transfer of the setting originated or to a central server. In some implementations, the user of the target device may have an option (not shown) to initiate a text chat or a call with the user of the device from which the transfer of the setting originated to obtain further details regarding the setting being transferred.

In some implementations, the user of the device from which the transfer of the setting originated may be notified whether the user of the target device selected either of icons 1006 or 1008 to accept or decline the transfer of the setting. In some implementations, if the user of the target device chooses to accept the transfer of the setting, the setting may be applied immediately. For example, if the setting pertains to website credentials to watch premium content on Hulu, the user of the target device may be able to navigate to Hulu using a web browser and watch premium content immediately. If the setting is an email, text message, calendar event, a reminder, or media content, then the transferred setting may automatically be opened in a suitable application by control circuitry 304 of the target device for immediate consumption by the user of the target device.

In some implementations, the device from which the setting originated may send further instructions to the target device to which the setting was transferred to apply the transferred setting so that it becomes effective. In some implementations, the target device to which the setting was transferred may automatically apply the transferred setting without waiting for additional instructions from the device which transferred the setting.

In some implementations, the user of the target device to which the setting was transferred may be able to further transfer the setting to other users. The further transfer of the setting in this manner may be contingent on associated restrictions by the original owner of the setting. For example, the original owner of the setting may have stipulated that the setting may only be actively applied on a single device other than the owner's own device. In this case, the recipient of the setting may not be able to transfer the received setting further to a third user.

Figure 11A:
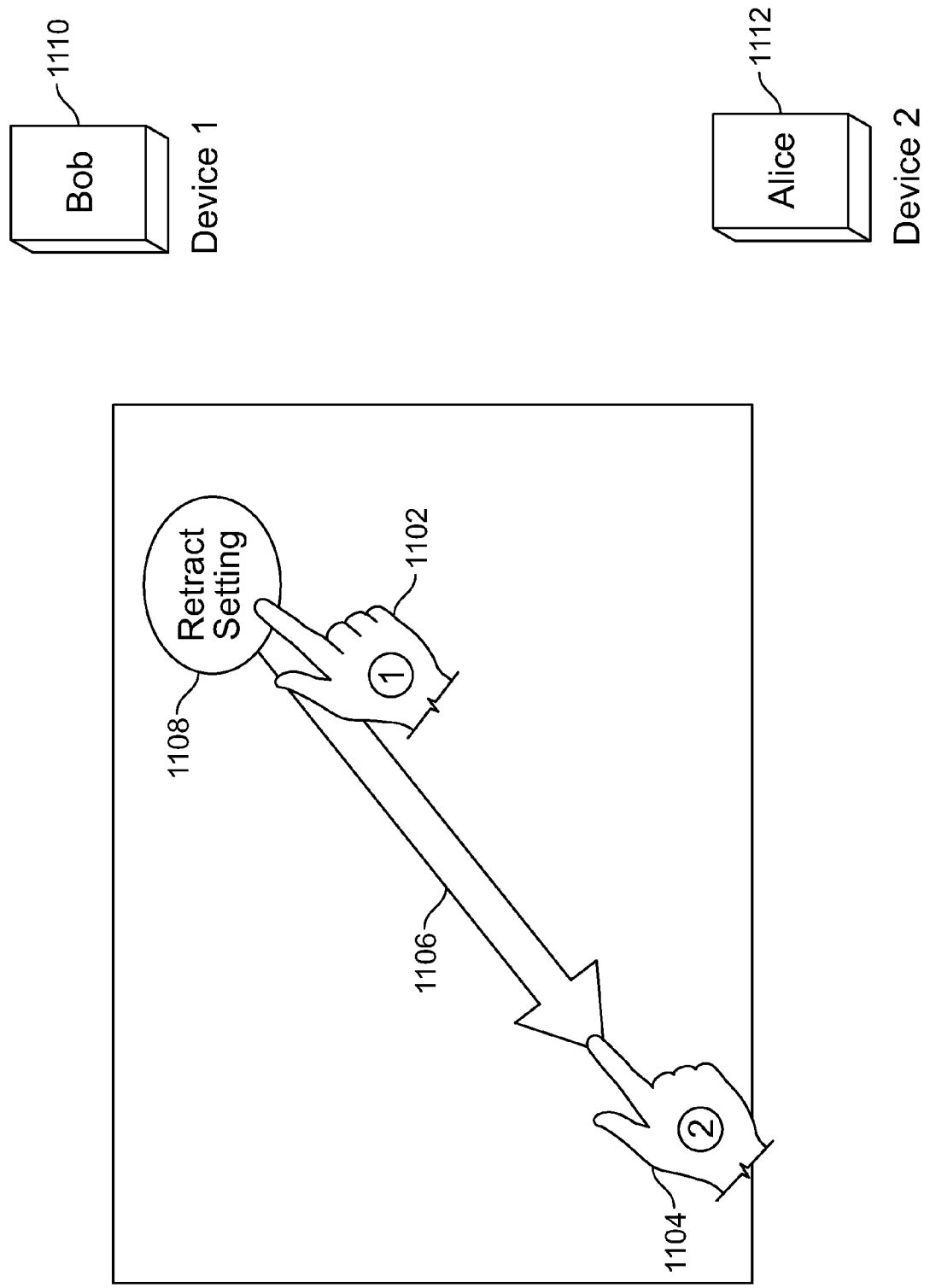

FIGS. 11(a) and 11(b) show an illustrative method for retracting a setting that was previously transferred to a target device in accordance with an embodiment of the invention. In some implementations, the user who transferred the setting may decide that he or she no longer wishes to share the setting and accordingly, the user may retract the setting that the user previously transferred. FIG. 11(a) shows user equipment device 300 present at a venue with other devices 1110 and 1112. For example, device 1110 may belong to user Bob to whom the user, John, had previously transferred a setting.

In some implementations, control circuitry 304 may present the user an option to retract a setting through a menu. Control circuitry 304 may receive a signal indicating user selection of the option to retract a setting. Control circuitry 304 may receive a user input performed via a gesture using, for example, a hand, indicative of the device from which he or she wants to retract the setting.

In some implementations, control circuitry 304 may detect that user has pressed down on the retract a setting option using a finger and has performed a swiping action dragging the setting from the direction of the device the user would like to retract that setting from towards his or her own device. Control circuitry 304 may receive the user input from user input interface 312 and may process the received user input to determine the direction the user is gesturing in. In some implementations, control circuitry 304 may store the received user input in storage 308 for future reference. For example, John may have authorized his friend, Bob, user of device 1110, to view the entire Battlestar Galactica series on-demand and John may desire to retract the authorization from Bob. To accomplish this, John may navigate to the retract a setting option, then press down on the option using a finger and simultaneously drag his finger back from the direction in which Bob is located relative to John. User input interface 312 may register such a user input and may transmit a signal generated based on the registered user input to control circuitry 304. Starting from position 1102, John may drag the option 1108 in direction 1106 to position 1104. In the event that Bob is located to the right of John, direction 1106 may be towards the left of starting position 1102. It will be understood that direction 1106 may change accordingly based on the location of Bob's device relative to the location of John's device.

In some implementations, the gesture John performs to retract a setting from Bob may be other than swiping a finger across screen 312. Continuing the above example, in some implementations, once John has selected the option to retract a setting from Bob, John may shake his mobile device in the relative direction in which Bob is located. In some implementations, John may shake his mobile device back and forth in the direction of Bob's mobile device several times. Control circuitry 304 may receive a selection of the option to retract a setting. Physical movement of John's device may be sensed by an accelerometer and a generated signal corresponding to the movement of John's device may be transmitted to control circuitry 304.

In some implementations, once control circuitry 304 has registered the direction from which the user wishes to retract the setting, control circuitry 304 may proceed to determine the device present in the direction indicated by the user. In some implementations, control circuitry 304 of the user's device may know or may learn the locations of neighboring devices associated with other users in substantially the same manner as that described above in the context of FIGS. 8(a) and 8(b).

In some implementations, control circuitry 304 may utilize the location information of the user's device and the direction registered based on the user's gesture to compute a vector matching the registered direction. The origin of the vector may be the coordinates of the user's device. Control circuitry 304 may make a comparison to check whether any of its neighboring devices lie on the computed vector. If a single match is detected, then control circuitry 304 has identified the target device from which the user wishes to retract a setting from. If multiple matches are detected, then control circuitry 304 may display the detected devices on display 312 and prompt the user to select the device(s) from which the user wishes to retract a setting from. The user may select the intended target device(s) from the list of detected devices displayed.

In some implementations, control circuitry 304 may utilize the location information of the user's device and the direction registered based on the user's gesture to compute a first vector at an angle above the registered direction. The origin of the first vector may be the coordinates of the user's device. In some implementations, the value of the angle may be substantially similar to the value of the angle described above in the context of FIGS. 8(a) and 8(b).

In some implementations, control circuitry 304 may also compute a second vector at an angle below the registered direction. The origin of the second vector may also be the coordinates of the user's device. The first and the second vectors may be used by control circuitry 304 to define upper and lower boundaries of a circular sector whose origin is the coordinates of the user's device and whose radius is the range of the user's device. Control circuitry 304 may use the circular sector defined in this manner as the space within which to search for devices the user has gestured he or she wishes to retract the setting from. For example, the circular sector may define a set of coordinates within which the device the user has gestured he or she wants to retract the setting from may lie. Accordingly, control circuitry 304 may check whether the coordinates (obtained from location information) of any of its neighboring devices lie in the circular sector. If control circuitry 304 determines that the coordinates of a single device lie in the circular sector, then control circuitry 304 may have successfully identified the target device from which the user wishes to retract the setting from. If multiple matches are detected, then control circuitry 304 may display the detected devices on display 312 and prompt the user to select the device which the user wishes to retract the setting from. The user may select the intended target device from the list of detected devices displayed.

In some implementations, control circuitry 304 may simply send the direction registered based on the user's gesture to the central server. In response, the central server may identify the target device which the user wishes to retract the setting from and send information to control circuitry 304 identifying the target device.

In some implementations, after control circuitry 304 has identified the target device from which the user wishes to retract a setting, control circuitry 304 may show display screen 1100 to the user. In some implementations, display screen 1100 may include title region 1114 and information region 1116. Title region 1114 may include a suitable combination of text and graphics to indicate to the user that display screen 1100 shows the settings previously transmitted to the target device from which the user wishes to retract a setting. In some implementations, title region 1114 may identify the user of the target device. For example, title region 1114 may indicate that control circuitry 304 has identified the target device from which the user wishes to retract a setting to be Bob's device 1110. In this manner, title region 1114 may serve as confirmation that control circuitry has correctly identified the device from which the user wishes to retract a setting from. In some implementations, display screen 1100 may show an option (not shown) to cancel retracting the setting from the target device identified in title region 1114. Control circuitry 304 may receive a selection of the option to cancel retracting the setting in the event that the device identified in title region 1114 is not the device the user intended to retract the setting from.

In some implementations, display screen 1100 may include information region 1116 which further includes a list of the settings the user has previously transferred to the target device identified by control circuitry 304 based on the user's gesture. In some implementations, control circuitry 304 may receive a selection of one or more of the settings displayed in information region 1116. Control circuitry 304 may then instruct the target device to stop applying the selected settings and to delete the settings. Once the target device has deleted the settings the user of the target device may no longer be able to access the settings. For example, if the user, John, retracts the setting authorizing his friend, Bob, to watch the entire Battlestar Galactica series, Bob will not be able to access the series further.

FIG. 12 shows an illustrative display screen that may list all settings that the user has transferred to other devices in accordance with an embodiment of the invention. In some implementations, display screen 1200 may include title region 1202, information region 1204, and icons 1206, 1208, and 1210. In some implementations, the user may navigate to display screen 1200 by navigating menus. In some implementations, control circuitry 304 may automatically show display screen 1200 when it detects that another device is close by.

Title region 1202 may indicate that display screen 1200 includes a list of settings that the user has transferred to other users. In some implementations, information region 1204 may be the list of settings that the user has transferred to other users. For example, information region 1204 may include any suitable combination of graphics and text and may display a comprehensive list of all the settings the user has previously transferred accompanied by the user the setting was transferred to. In some implementations, icons 1206, 1208, and 1210 may indicate the user to which a setting was transferred. Icons 1206, 1208, and 1210 may include any suitable combination of text, graphics, or other visual identifiers. For example, icon 1206 may indicate that the setting authorizing the viewing of PG-13 programs was transferred previously to Bob, icon 1208 may indicate that the setting pertaining to John's favorite channels was transferred previously to Bob, and icon 1210 may indicate that the setting authorizing the viewing of programs with violence was previously transmitted to Alice.

In some implementations, control circuitry 304 may receive a selection of one or more of the settings shown on display screen 1200 with an indication of retracting the selected settings. In some implementations, display screen 1200 may thus provide an alternative to the method discussed above in the context of FIGS. 11(*a*) and 11(*b*) to retract previously transferred settings. In some implementations, control circuitry 304 may receive a selection of settings shown on display screen 1200 that the user wishes to retract. For example, the user may wish to retract the setting previously transferred to Bob which authorized Bob to view PG-13 programs.

In some implementations, control circuitry 304 may determine whether the device from which the user wishes to retract a setting is within range. If control circuitry 304 determines that the device from which the user wishes to retract a setting is within range, control circuitry 304 may send a message directly to that device containing instructions to not apply the setting any further and to additionally delete the setting. If control circuitry 304 determines that the device from which the user wishes to retract a setting is not within range, then control circuitry 304 may notify the user of this fact and may prompt the user to try again later. In some implementations, control circuitry 304 may send the message containing instructions to not apply the setting any further and to additionally delete the setting to a central server instead of sending the message to the device directly. The central server may then relay the message containing the instructions to the device.

In some implementations, the default behavior of control circuitry 304 may be to send the message containing instructions to not apply the setting any further and to additionally delete the setting to the central server. Such default behavior may be beneficial in that the message containing the instructions will be delivered to the device from which the user wishes to retract the setting regardless of whether or not control circuitry 304 determines that device to be within range.

Figure 13:
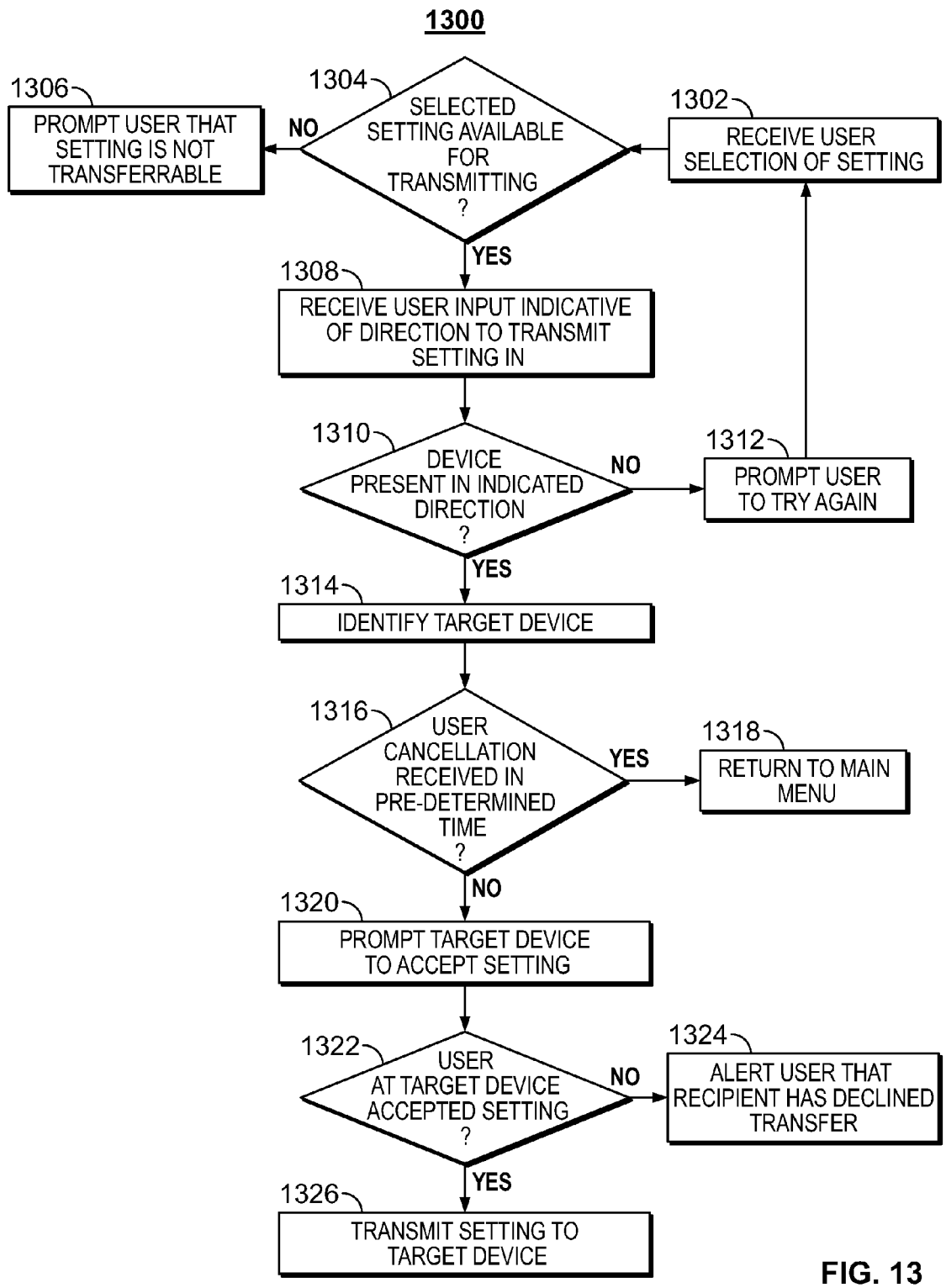
FIGS. 13, 14, and 15 show illustrative flow diagrams for transferring a setting to another device based on user gestures in accordance with an embodiment of the invention.

FIG. 13 shows an illustrative flow diagram for transferring a setting to another device based on user gestures in accordance with an embodiment of the invention. At step 1302, control circuitry 304 may receive a selection of a setting. The setting may be selected based on display screen 600. The setting may alternatively be selected from any other suitable navigational item on his or her device. For example, the user may be updating his or favorite channels and may decide to transfer the setting pertaining to favorite channels to another user.

At step 1304, control circuitry 304 may make a determination as to whether the setting selected by the user in step 1302 is in fact transferable to another user. For example, control circuitry 304 may receive a selection of a setting authorizing the recording of an on-demand movie. However, control circuitry 304 may determine that the user's access rights to the selected on-demand movie are valid for only a single user and therefore, cannot be transferred to another user. In response to determining that the setting selected by the user is transferable, the process proceeds to step 1308. Otherwise the process proceeds to step 1306 to prompt the user that the selected setting is not transferable to another user.

At step 1308, control circuitry 304 may receive a user input indicative of the device to which the user wishes to transmit the selected setting. The user input may be received in any of the forms discussed above in connection with FIGS. 8(*a*) and 8(*b*). For example, the user may press down on the selected setting using a finger and perform a swiping gesture in the direction of the device to which the user wishes to transfer the setting. Control circuitry 304 may process the received user input to determine the direction indicated by the user input. Control circuitry 304 may perform the determination of the direction using standard signal processing techniques.

At step 1310, control circuitry 304 may make a determination as to whether any device is present in the direction indicated by the user input in step 1308. The determination may be made by control circuitry 304 using any of the techniques discussed above in connection with FIGS. 8(*a*) and 8(*b*). For example, control circuitry 304 may make the determination locally by checking whether any of its neighboring devices are present in a circular sector oriented in the direction indicated by the user. Alternatively, control circuitry 304 may send the direction indicated by the user input to a central server which may respond with a list of devices present in the direction indicated by the user input. In response to determining that no devices are present in the direction indicated by the user input, the process proceeds to step 1312 where control circuitry 304 may prompt the user to try inputting the direction again. The process proceeds back to step 1302 after displaying the prompt to the user. Otherwise the process proceeds to step 1314.

At step 1314, control circuitry 304 may identify the target device indicated by the user input received in step 1308. Control circuitry 304 may identify the target device using any of the techniques described above in connection with FIGS. 8(*a*) and 8(*b*). If control circuitry 304 identifies multiple devices as the potential target device, control circuitry 304 may display the list of the multiple devices to the user on display screen 312 and may prompt the user to select the intended target device. Once a target device has been uniquely identified, control circuitry 304 may show the user display screen 900 prompting the user to confirm transfer of the setting to the identified target device. Display screen 900 may include a timer that counts down from a starting value while control circuitry 304 waits for user confirmation.

At step 1316, control circuitry 304 may make a determination as to whether a user input cancelling the transfer of the setting to the identified target device has been received before the timer of display screen 900 reaches zero. In response to determining that a user input cancelling the transfer of the setting to the identified target device has been received before the timer of display screen 900 reaches zero, the process proceeds to step 1318 where control circuitry 304 returns the user to the main menu or to the screen the user was previously viewing before the selection of the setting in step 1302. Otherwise, the process proceeds to step 1320.

At step 1320, display screen 900 is shown to the user at the identified target device prompting the user to accept the setting being transferred. For example, the user at the identified target device may be given an opportunity to learn further details about the setting being transferred and to subsequently accept or decline the transfer.

At step 1322, control circuitry 304 may make a determination as to whether the user at the identified target device has accepted the transfer of the setting. In response to determining that the user at the identified target device has declined the transfer of the setting, the process proceeds to step 1324 where control circuitry 304 notifies the user that the user at the identified target device has declined the transfer of the setting. Otherwise, the process proceeds to step 1326.

At step 1326, control circuitry 304 transfers the setting to the identified target device. In some implementations, control circuitry 304 may send further instructions to the identified target device to apply the setting so that it becomes active on the identified target device. In some implementations, control circuitry 304 may notify the user that the transfer of the setting has been completed successfully.

Figure 14:
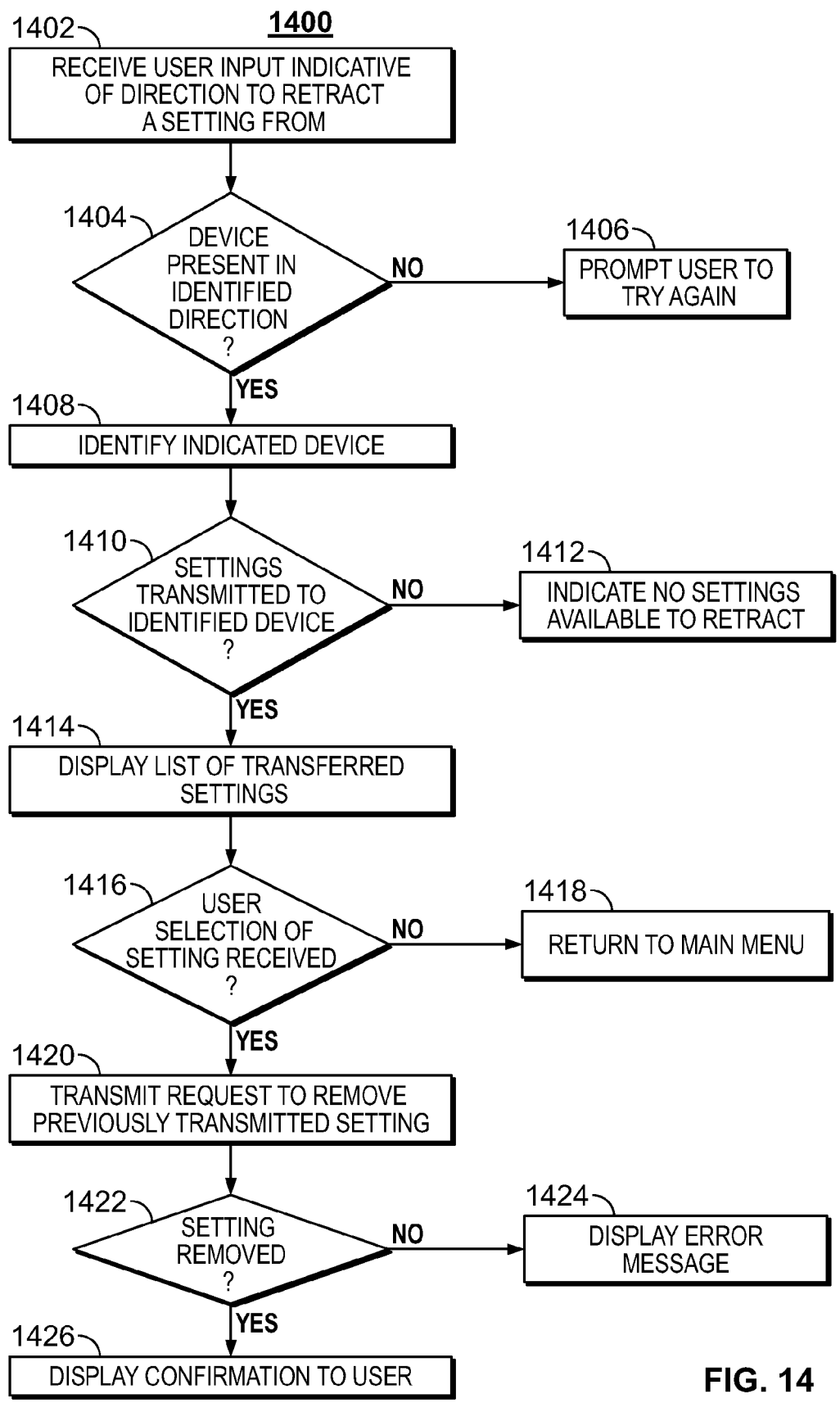

FIG. 14 shows an illustrative flow diagram for retracting a setting from another device based on user gestures in accordance with an embodiment of the invention. At step 1402, control circuitry 304 receives a user input that indicates, using a direction, a device from which the user wishes to retract a setting. The user input may indicate the direction using any of the techniques discussed above in connection with FIGS. 11(*a*) and 11(*b*). For example, the user may use a finger to swipe on screen 312 starting from a position relatively close to the device from which the user wishes to retract a setting and ending the swipe at a position relatively close to the user's own location. In some implementations, the user may use one or more fingers to perform the swiping gesture.

At step 1404, a determination is made as to whether any device is present in the direction indicated by the user input in step 1402. The determination may be made by control circuitry 304 using any of the techniques discussed above in connection with FIGS. 11(*a*) and 11(*b*). For example, control circuitry 304 may make the determination locally by checking whether any of its neighboring devices are present in a circular sector oriented in the direction indicated by the user. Alternatively, control circuitry 304 may send the direction indicated by the user input to a central server which may respond with a list of devices present in the direction indicated by the user input. In response to determining that no devices are present in the direction indicated by the user input, the process proceeds to step 1406 where control circuitry 304 may prompt the user to try inputting the direction again. Otherwise the process proceeds to step 1408.

At step 1408, control circuitry 304 may identify the target device indicated by the user input received in step 1402. Control circuitry 304 may identify the target device using any of the techniques described above in connection with FIGS. 11(*a*) and 11(*b*). If control circuitry 304 identifies multiple devices as the potential target device, control circuitry 304 may display the list of the multiple devices to the user on display screen 312 and may prompt the user to select the intended target device.

At step 1410, a determination is made as to whether the user has previously transferred any settings to the device identified in step 1408. For example, control circuitry 304 may query an internal database to determine whether the user previously transferred any settings to the identified device. In some implementations, control circuitry 304 may query a central server to determine whether the user previously transferred any settings to the identified device. In some implementations, control circuitry 304 may query the identified device to determine whether the user previously transferred any settings to the identified device. In response to determining that the user has not previously transferred any settings to the identified device, the process proceeds to step 1412 where control circuitry 304 prompts the user that there are no settings available to retract from the identified device. Otherwise, the process proceeds to step 1414.

At step 1414, control circuitry 304 displays a list of all the settings available for the user to retract from the identified device. The list of settings displayed may be substantially similar to display screen 1100 discussed above in connection with FIG. 11(*b*). Control circuitry 304 may receive a selection of one or more of the settings displayed to retract from the identified device.

At step 1416, a determination is made as to whether a user selection of a setting to retract is received. For example, control circuitry 304 may wait for a pre-determined amount of time to receive the user selection of a setting. In response to determining that no user selection of a setting has been received in the pre-determined amount of time, the process proceeds to step 1418 where control circuitry 304 returns the user to the main menu or the screen the user was viewing prior to step 1402. Otherwise, the process proceeds to step 1420.

At step 1420, control circuitry 304 transmits an instruction to the identified device to remove the setting selected by the user after step 1414. Control circuitry 304 may send the instruction to the identified device using any of the methods discussed above in connection with FIGS. 11(*a*), 11(*b*), and 12.

At step 1422, a determination is made as to whether the identified device has removed the setting based on the instruction received from control circuitry 304. For example, control circuitry 304 may receive a message from the identified device confirming that the setting has been removed and deleted. In response to determining that the identified target device has not successfully removed the setting, the process proceeds to step 1424 where control circuitry 304 displays an error message to the user indicating that the identified target device has not removed the setting. Otherwise, the process proceeds to step 1426.

At step 1426, control circuitry 304 displays a message confirming to the user that the identified device has removed and deleted the setting.

Figure 15:
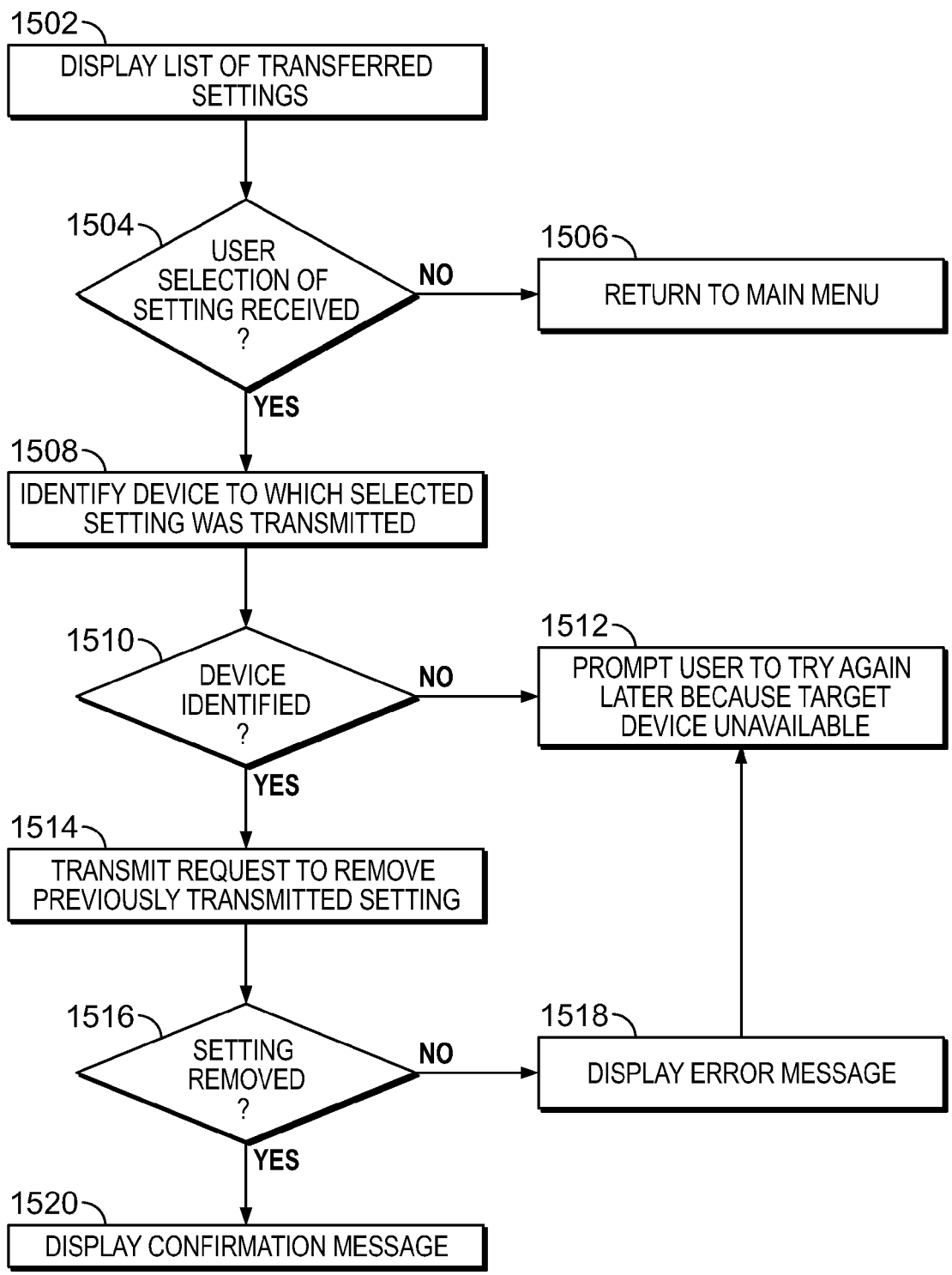

FIG. 15 shows an illustrative flow diagram for retracting a setting from another device based on user gestures in accordance with an embodiment of the invention. At step 1502, control circuitry 304 may display a list of all settings the user has transferred previously to any other user. The manner in which the previously transferred settings are displayed may be substantially similar to the discussion above in connection with FIG. 12. For example, the settings may be grouped according to the user to whom the setting was transferred, alphabetically, according to the setting category, or any other suitable grouping.

At step 1504, a determination is made as to whether a user selection of a setting to retract is received. For example, control circuitry 304 may wait for a pre-determined amount of time to receive the user selection of a setting. In response to determining that no user selection of a setting has been received in the pre-determined amount of time, the process proceeds to step 1506 where control circuitry 304 returns the user to the main menu or the screen the user was viewing prior to step 1502. Otherwise, the process proceeds to step 1508.

At step 1508, control circuitry 304 may identify the device to which the setting selected by the user prior to step 1504 was previously transferred. The device to which the setting was transferred may be determined using any of the methods discussed above in connection with FIG. 12. For example, control circuitry 304 may query an internal database which stores all settings that have been transferred to other devices or a central server. In some implementations, identifying the device to which the selected setting was previously transferred may simply be determining whether the device is within range of control circuitry 304. If the device is not within range of control circuitry 304, then control circuitry 304 may not be able to send instructions to the device directly. However, control circuitry 304 may instead send an instruction to the device over the Internet via an intermediate central server.

At step 1510, a determination is made as to whether control circuitry 304 was able to identify the device in step 1508. In response to determining that control circuitry 304 was unable to identify the device, the process proceeds to step 1512 where the user is prompted to try retracting the setting at a later time because the device is unavailable. Otherwise, the process proceeds to step 1514.

At step 1514, control circuitry 304 transmits an instruction to the identified device to remove the setting selected by the user after step 1502. Control circuitry 304 may send the instruction to the identified device using any of the methods discussed above in connection with FIGS. 11(*a*), 11(*b*), and 12.

At step 1516, a determination is made as to whether the identified device has removed the setting based on the instruction received from control circuitry 304. For example, control circuitry 304 may receive a message from the identified device confirming that the setting has been removed and deleted. In response to determining that the identified target device has not successfully removed the setting, the process proceeds to step 1518 where control circuitry 304 displays an error message to the user indicating that the identified target device has not removed the setting. Otherwise, the process proceeds to step 1520.

At step 1520, control circuitry 304 displays a message confirming to the user that the identified device has removed and deleted the setting.

Figure 16:
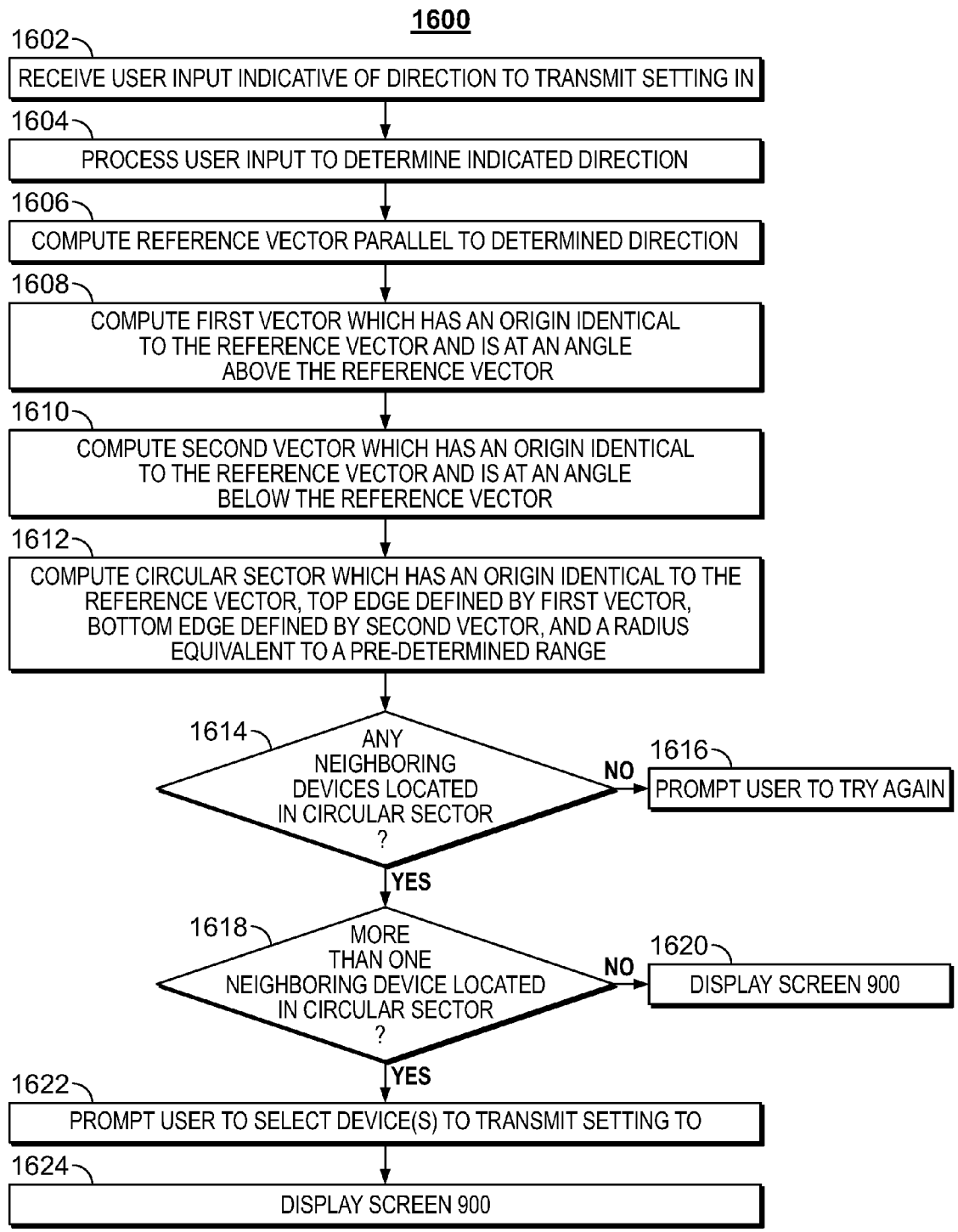
FIG. 16 shows an illustrative flow diagram for identifying a target device from a plurality of devices in accordance with an embodiment of the invention.

FIG. 16 shows an illustrative flow diagram for identifying a target device from a plurality of devices in accordance with an embodiment of the invention. At step 1602, control circuitry 304 may receive a user input from user input interface 310 indicative of the device to which the user wishes to transmit the selected setting. For example, user input interface 310 may transmit data identifying the pixels of the touch screen which registered the pressure exerted by the user's finger(s) during the gesture (in the sequence the touch screen registered the user's finger(s) exerted pressure on the pixels) to control circuitry 304. The user input may be received in any of the forms discussed above in connection with FIGS. 8(*a*) and 8(*b*).

At step 1604, control circuitry 304 may process the received user input to identify the direction indicated by the user in the user input. For example, using the received sequence of pixels, control circuitry 304 may determine the direction indicated by the user input by using a look-up table. Control circuitry 304 may also determine the direction based on the position of the pixels in the sequence of pixels relative to other pixels on the touch screen.

At step 1606, control circuitry 304 may compute a reference vector parallel to the direction identified at step 1604. The reference vector may be a vector of coordinates where each entry of the reference vector is a coordinate that lies along the direction identified at step 1604. The first entry of the reference vector, the origin, may be the coordinates of the user's device. The coordinate in each subsequent entry of the reference vector may be a pre-determined distance away from the coordinate at the previous entry of the reference vector. The coordinate in the last entry of the reference vector may be at a pre-determined distance away from the coordinate in the first entry of the reference vector.

At step 1608, control circuitry 304 may compute a first vector where the first entry of the first vector (i.e., the origin of the first vector) is identical to the first entry of the reference vector and where the direction of the first vector is at an angle above the reference vector. The first vector may be computed in the manner discussed above in connection with FIGS. 8(*a*) and 8(*b*).

At step 1610, control circuitry 304 may compute a second vector where the first entry of the first vector (i.e., the origin of the second vector) is identical to the first entry of the reference vector and where the direction of the second vector is at an angle below the reference vector. The second vector may be computed in the manner discussed above in connection with FIGS. 8(*a*) and 8(*b*). The angle by which the direction of the second vector is below the reference vector may be identical to or different from the angle by which the direction of the first vector is above the reference vector.

At step 1612, control circuitry 304 may determine a circular sector such that the first and the second vectors are used to define the upper and lower boundaries of the circular sector whose origin is the coordinates of the user's device and whose radius is the range of the user's device. The circular sector may define a set of coordinates within which the device the user has gestured he or she wants to transmit the selected setting to may lie.

At step 1614, control circuitry may determine whether any devices neighboring the user's device are located within the set of coordinates defined by the circular sector determined at step 1612. For example, control circuitry 304 may examine the coordinates of each of its neighboring devices to determine whether the coordinates of the respective neighboring device are contained in the set of coordinates defined by the circular sector determined at step 1610. In response to determining that the coordinates of none of the devices neighboring the user's device are contained in the set of coordinates defined by the circular sector determined at step 1610, the process proceeds to step 1616 where the user is prompted to try indicating the direction of the device to which the setting is to be transferred again. Otherwise, the process proceeds to step 1618.

At step 1618, control circuitry 304 may determine whether more than one devices neighboring the user's device are located within the set of coordinates defined by the circular sector determined at step 1612. In response to determining that only a single neighboring device has coordinates which are contained in the set of coordinates defined by the circular sector determined at step 1612, the process proceeds to step 1620 where control circuitry 304 shows display screen 900 to the user. Otherwise the process proceeds to step 1622.

At step 1622, control circuitry 304 may display a list of the devices identified at step 1614 and may prompt the user to identify and select one or more of the listed devices. At step 1624, control circuitry 304 shows display screen 900 to the user.

Figure 17:
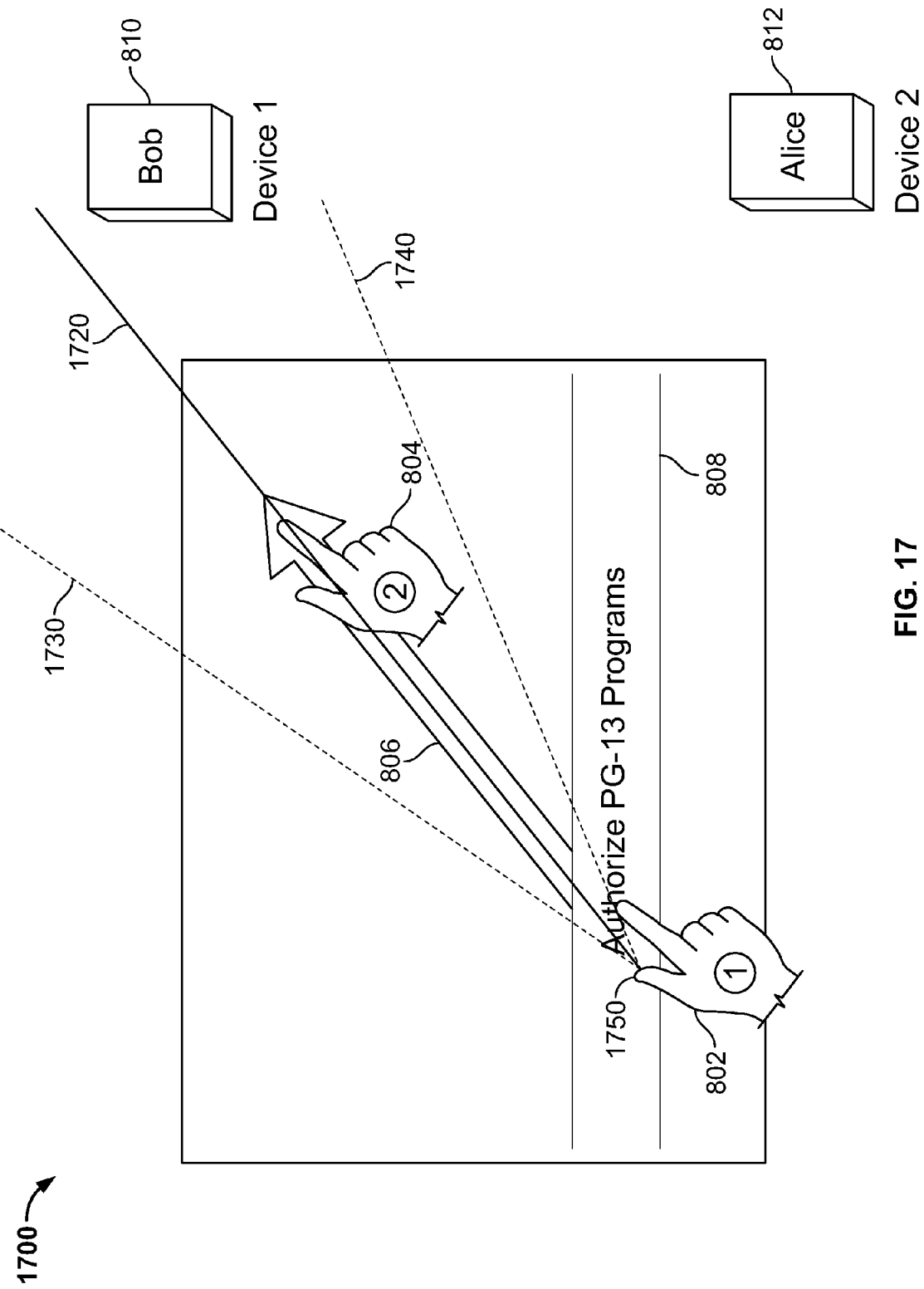
FIG. 17 shows an illustrative method for identifying a target device from a plurality of devices in accordance with an embodiment of the invention.

FIG. 17 shows an illustrative method for identifying a target device from a plurality of devices in accordance with an embodiment of the invention. Each of the other users may have a corresponding device. Two of the user's friends Bob and Alice, each having devices 810 and 812, respectively, may be at the venue with the user. In some implementations, control circuitry 304 may detect that user has pressed down on a setting shown on display screen 600 using a finger and has performed a swiping action dragging the setting in the direction of the device the user would like to transfer that setting to—starting from position 802, the user may drag setting 808 in direction 806 to position 804. Accordingly, based on the user input indicative of direction 806, control circuitry 304 may compute reference vector 1720 where the direction of reference vector 1720 is parallel to direction 806. In addition, as discussed above in connection with FIGS. 8(*a*) and 8(*b*), control circuitry 304 may compute first vector 1730 whose direction is at an angle above reference vector 1720 and second vector 1740 whose direction is at an angle below reference vector 1720. The origin of each of reference vector 1730, first vector 1730, and second vector 1740 may be point 1750. In some implementations, point 1750 may be the coordinates of the user's mobile device. Control circuitry 304 may determine the coordinates of the user's mobile device using any of the techniques discuss above, e.g., using a GPS or triangulation methods.

It should be understood that the above steps of the flow diagrams of FIGS. 13, 14, 15, and 16 may be executed or performed in any order or sequence not limited to the order and sequence shown and described in the figures. Also, some of the above steps of the flow diagrams of FIGS. 13, 14, 15, and 16 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for transferring settings between user devices, the method comprising:
   receiving a media guidance application setting, wherein the setting was selected at a first user device;
   receiving physical contact, with the first user device, indicative of a direction;
   identifying a target device by determining which of a plurality of user devices within a predetermined range of the first user device corresponds to the direction indicated by the physical contact;
   generating for display a message requesting user confirmation before transmitting the selected setting to the target device;
   transmitting the selected setting to the target device to cause the selected setting to be applied to the target device, in response to receiving the user confirmation or automatically when the user confirmation is not received within a predetermined amount of time.

2. The method of claim 1, wherein the physical contact is a first user input, further comprising:
   receiving a second user input requesting retrieval of the selected setting from the target device;
   identifying the target device at which the setting was applied based on the second user input;
   causing the setting to be removed from the target device.

3. The method of claim 2, wherein the second user input is a gesture performed on a touch screen of the first user device, and wherein the gesture is a movement from a location of the target device towards a location of the first user device.

4. The method of claim 1, wherein the physical contact is a gesture performed on a touch screen of the first user device, and wherein the gesture is a movement from a location of the first user device towards a location of the target device.

5. The method of claim 4, wherein identifying the target device comprises determining whether a location of the target device relative to the first device corresponds to a line parallel to the gesture.

6. The method of claim 1, wherein the setting comprises media content authorization information for media content that the first device has authority to access and the target device lacks authority to access.

7. The method of claim 1, wherein selecting the media guidance application setting comprises:
displaying a list of settings; and
selecting one of the settings in the list.

8. The method of claim 1, wherein identifying the target device further comprises:
determining the direction indicated by the physical contact;
computing a vector of coordinates based on the determined direction; and
determining which of the plurality of user devices within the predetermined range of the first user device are located on the computed vector of coordinates.

9. A system for transferring settings, the system comprising a first user device configured to:
receive a selection of a media guidance application setting;
receive a physical contact indicative of a direction;
identify a target device by determining which of a plurality of user devices within a predetermined range of the first user device corresponds to the direction indicated by the physical contact;
display a message requesting user confirmation before transmitting the selected setting to the target device; and
transmit the selected setting to the target device to cause the selected setting to be applied to the target device, in response to receiving the user confirmation or automatically when the user confirmation is not received within a predetermined amount of time.

10. The system of claim 9, wherein the physical contact is a first user input and the first user device is further configured to:
receive a second user input requesting retrieval of the selected setting from the target device;
identify the target device at which the setting was applied based on the second user input;
cause the setting to be removed from the target device.

11. The system of claim 10, wherein the second user input is a gesture performed on a touch screen of the first user device, and wherein the gesture is a movement from a location of the target device towards a location of the first user device.

12. The system of claim 9, wherein the physical contact is a gesture performed on a touch screen of the first user device, and wherein the gesture is a movement from a location of the first user device towards a location of the target device.

13. The system of claim 12, wherein the first user device is further configured to identify the target device by determining whether a location of the target device relative to the first device corresponds to a line parallel to the gesture.

14. The system of claim 9, wherein the setting comprises media content authorization information for media content that the first device has authority to access and the target device lacks authority to access.

15. The system of claim 9, wherein the first user device is further configured to:
display a list of media guidance application settings; and
receive a selection of one of the settings in the list.

16. The system of claim 9, wherein to identify the target device the first user device is further configured to:
determine the direction indicated by the physical contact;
compute a vector of coordinates based on the determined direction; and
determine which of the plurality of user devices within the predetermined range of the first user device are located on the computed vector of coordinates.

17. The method of claim 1, wherein the target device is remote from the first user device.

18. The method of claim 1, wherein the target device is not in communication with the first user device prior to transmitting the selected setting to the target device.

* * * * *